US009731716B2

(12) United States Patent
Ohsugi et al.

(10) Patent No.: US 9,731,716 B2
(45) Date of Patent: Aug. 15, 2017

(54) TRANSPORTER VEHICLE, DUMP TRUCK, AND TRANSPORTER VEHICLE CONTROL METHOD

(71) Applicant: Komatsu Ltd., Tokyo (JP)

(72) Inventors: Shigeru Ohsugi, Hiratsuka (JP); Shinji Mitsuta, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 272 days.

(21) Appl. No.: 14/400,888

(22) PCT Filed: Jul. 30, 2014

(86) PCT No.: PCT/JP2014/070139
§ 371 (c)(1),
(2) Date: Nov. 13, 2014

(87) PCT Pub. No.: WO2016/016981
PCT Pub. Date: Feb. 4, 2016

(65) Prior Publication Data
US 2016/0264133 A1    Sep. 15, 2016

(51) Int. Cl.
*B60T 7/22*  (2006.01)
*B60W 30/09*  (2012.01)
(Continued)

(52) U.S. Cl.
CPC .............. *B60W 30/09* (2013.01); *B60P 1/04* (2013.01); *B60T 7/22* (2013.01); *B60W 10/20* (2013.01);
(Continued)

(58) Field of Classification Search
CPC .......... G08G 1/166; G08G 1/165; B60T 7/22; G01S 13/931; E21F 11/00; B60L 3/0007; B60W 30/08; B60N 2/64; B60R 21/013
See application file for complete search history.

(56) References Cited

U.S. PATENT DOCUMENTS 5,530,651 A * 6/1996 Uemura ................... B60T 7/22
                                                         180/169
2005/0033516 A1* 2/2005 Kawasaki ............ B60R 21/013
                                                         701/301
(Continued)

FOREIGN PATENT DOCUMENTS

AU    2013228729 A1    8/2014
CN     202480890 U    10/2012
(Continued)

OTHER PUBLICATIONS

Office Action dated Feb. 1, 2016, issued for the corresponding Canadian Patent Application No. 2,893,470.
(Continued)

*Primary Examiner* — Yuri Kan
(74) *Attorney, Agent, or Firm* — Locke Lord LLP

(57) ABSTRACT

A transporter vehicle includes: a traveling device changing a traveling direction so that one state of a linear movement state and a non-linear movement state changes to the other state thereof; a setting unit setting a determination value related to a change amount in the traveling direction from the linear movement state; a collision prevention system including an object detection device detecting an object in front of the vehicle and a collision determination unit determining a possibility of a collision with the object based on a detection result of the object detection device, the collision prevention system performing a process for reducing damage caused by the collision with the object; and an invalidation unit invalidating at least a part of a process of the collision prevention system based on the determination value and a detection value of the change amount in the traveling direction from the linear movement state.

11 Claims, 14 Drawing Sheets

(51) Int. Cl.
 *B60P 1/04* (2006.01)
 *B60W 10/20* (2006.01)
 *G05D 1/02* (2006.01)
 *G08G 1/16* (2006.01)
(52) U.S. Cl.
 CPC .......... *G05D 1/021* (2013.01); *G05D 1/0289* (2013.01); *G08G 1/166* (2013.01); *B60T 2201/022* (2013.01); *G05D 2201/021* (2013.01)

(56) References Cited

U.S. PATENT DOCUMENTS

| 2006/0097570 | A1  | 5/2006  | Doerr et al. | |
|---|---|---|---|---|
| 2009/0008974 | A1* | 1/2009  | Hattori | B60N 2/64 297/217.3 |
| 2010/0044126 | A1* | 2/2010  | Ohno | B60L 3/0007 180/65.1 |
| 2012/0262284 | A1* | 10/2012 | Irrgang | B60W 30/0956 340/435 |
| 2014/0236428 | A1* | 8/2014  | Akiyama | G08G 1/165 701/42 |
| 2014/0350838 | A1* | 11/2014 | Hayashi | G01S 13/931 701/301 |
| 2015/0232073 | A1* | 8/2015  | Fujishiro | B60T 7/22 701/70 |
| 2015/0274072 | A1* | 10/2015 | Croteau | E21F 11/00 340/903 |

FOREIGN PATENT DOCUMENTS

| JP | 05-203746 A | 8/1993 | | |
|---|---|---|---|---|
| JP | 06-051904 U | 7/1994 | | |
| JP | 08-153300 A | 6/1996 | | |
| JP | 08-285881 A | 11/1996 | | |
| JP | 2011051572 A | * | 3/2011 | ........... B60W 30/08 |
| JP | 2012-149974 A | 8/2012 | | |
| WO | 2013/080009 A2 | 6/2013 | | |
| WO | WO-2013/133004 A1 | 9/2013 | | |

OTHER PUBLICATIONS

International Search Report and Written Opinion mailed Oct. 28, 2014, issued for PCT/JP2014/070139.

* cited by examiner

TRANSPORTER VEHICLE, DUMP TRUCK, AND TRANSPORTER VEHICLE CONTROL METHOD

FIELD

The present invention relates to a transporter vehicle, a dump truck, and a transporter vehicle control method.

BACKGROUND

In a mining site of a mine, a transporter vehicle such as a dump truck is operated, and the transporter vehicle transports cut stones or the like. The transporter vehicle travels along a traveling road provided in the mine in a loading state where cut stones or the like are loaded on the transporter vehicle or an empty state where no load exists therein. When the traveling transporter vehicle collides with an object, the transporter vehicle is damaged, and hence the operation of transporting cut stones or the like is disturbed. Thus, the productivity of the mining site is degraded. For that reason, a collision prevention device disclosed in Patent Literature 1 is used in the transporter vehicle.

CITATION LIST

Patent Literature

Patent Literature 1: Unexamined Japanese Utility Model No. 06-051904

SUMMARY

Technical Problem

When an object is detected while the transporter vehicle travels, the traveling operation of the transporter vehicle is limited in order to prevent the collision with the object. When the traveling operation of the transporter vehicle is excessively limited, there is a possibility that the work efficiency of the transporter vehicle may be degraded.

An aspect of the invention is to provide a transporter vehicle, a dump truck, and a transporter vehicle control method capable of suppressing degradation in work efficiency while reducing damage caused by a collision with an object.

Solution to Problem

A first aspect of the present invention provides a transporter vehicle comprising: a traveling device capable of changing a traveling direction so that one state of a linear movement state and a non-linear movement state changes to the other state of the linear movement state and the non-linear movement state; a determination value setting unit that sets a determination value related to a change amount in the traveling direction from the linear movement state; a collision prevention system that includes an object detection device which detects an object in front of the vehicle and a collision determination unit which determines a possibility of a collision with the object based on a detection result of the object detection device, the collision prevention system being capable of performing a process for reducing damage caused by the collision with the object; and an invalidation unit that invalidates at least a part of a process of the collision prevention system based on the determination value and a detection value of the change amount in the traveling direction from the linear movement state.

A second aspect of the present invention provides a dump truck comprising: a traveling device capable of changing a traveling direction so that one state of a linear movement state and a non-linear movement state changes to the other state of the linear movement state and the non-linear movement state; a determination value setting unit that sets a determination value related to a change amount in the traveling direction from the linear movement state; a collision prevention system that includes an object detection device which detects an object in front of the vehicle, a collision determination unit which determines a possibility of collision with the object based on a detection result of the object detection device, and a control unit which outputs a control signal for reducing a damage caused by the collision based on a determination result of the collision determination unit, the collision prevention system being capable of performing a process for reducing the damage caused by the collision with the object; an invalidation unit that invalidates the control signal output from the control unit of the collision prevention system based on the determination value and the detection value of the change amount in the traveling direction from the linear movement state; and a process system that is operated to reduce the damage caused by the collision with the object, wherein even when the collision determination unit determines that there is a high possibility of the collision based on the detection result of the object detection device, the invalidation unit performs the invalidation when the detection value is larger than the determination value.

A third aspect of the present invention provides a transporter vehicle control method comprising: detecting a change amount in a traveling direction from a linear movement state of a transporter vehicle including a traveling device capable of changing the traveling direction so that one state of the linear movement state and a non-linear movement state changes to the other state of the linear movement state and the non-linear movement state; setting a determination value related to the change amount in the traveling direction from the linear movement state; detecting an object in front of the transporter vehicle by an object detection device of a collision prevention system provided in the transporter vehicle; determining a possibility of collision between the transporter vehicle and the object in a collision determination unit of the collision prevention system based on a detection result of the object detection device; and invalidating at least a part of a process for reducing damage caused by the collision between the transporter vehicle and the object in the collision prevention system based on the determination value and a detection value of the change amount in the traveling direction.

Advantageous Effects of Invention

According to the aspect of the invention, it is possible to provide a transporter vehicle and a transporter vehicle control method capable of suppressing degradation in work efficiency while reducing damage caused by a collision with an object.

DESCRIPTION OF EMBODIMENTS

Hereinafter, embodiments of the invention will be described with reference to the drawings, but the invention is not limited thereto. The components of the embodiments described below may be appropriately combined. Further, a part of the components may not be used in some cases.

<First Embodiment>

A first embodiment will be described.

(Mining Site of Mine)

Figure 1:
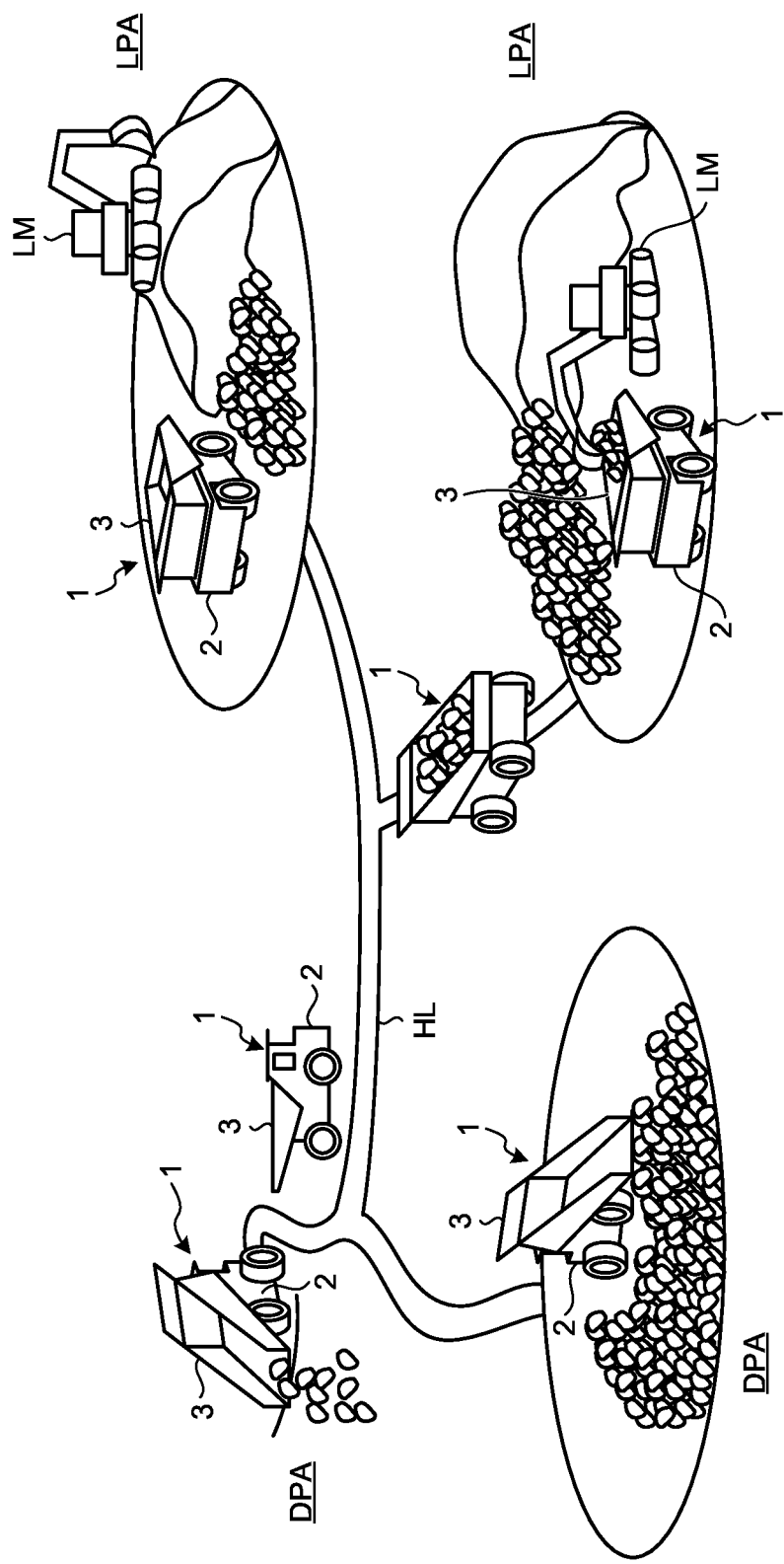
FIG. 1 is a schematic view illustrating an example of a mining site of a mine.

FIG. 1 is a schematic view illustrating an example of a mining site of a mine where a transporter vehicle according to the embodiment is movable. The transporter vehicle is a dump truck 1 that includes a vehicle 2 and a vessel 3 provided in the vehicle 2. The dump truck 1 transports a load loaded on the vessel 3. The load includes mined cut stone or at least one of soil and ore.

In the mining site of the mine, a traveling road HL is provided so as to be connected to a loading field LPA and a soil disposal field DPA or at least one of the loading field LPA and the soil disposal field DPA. The dump truck 1 may travel on at least one of the loading field LPA, the soil disposal field DPA, and the traveling road HL. The dump truck 1 may move between the loading field LPA and the soil disposal field DPA while traveling along the traveling road HL.

In the loading field LPA, a load may be loaded on the vessel 3. The load may be loaded on the vessel 3 by the loading machine LM. An excavator or a wheel loader is used as the loading machine LM. The dump truck 1 on which the load is loaded travels along the traveling road HL from the loading field LPA to the soil disposal field DPA. In the soil disposal field DPA, a load is discharged from the vessel 3. The dump truck 1 from which the load is discharged travels along the traveling road HL from the soil disposal field DPA to the loading field LPA. Furthermore, the dump truck 1 may travel from the soil disposal field DPA to a predetermined waiting station.

(Dump Truck)

Figure 2:
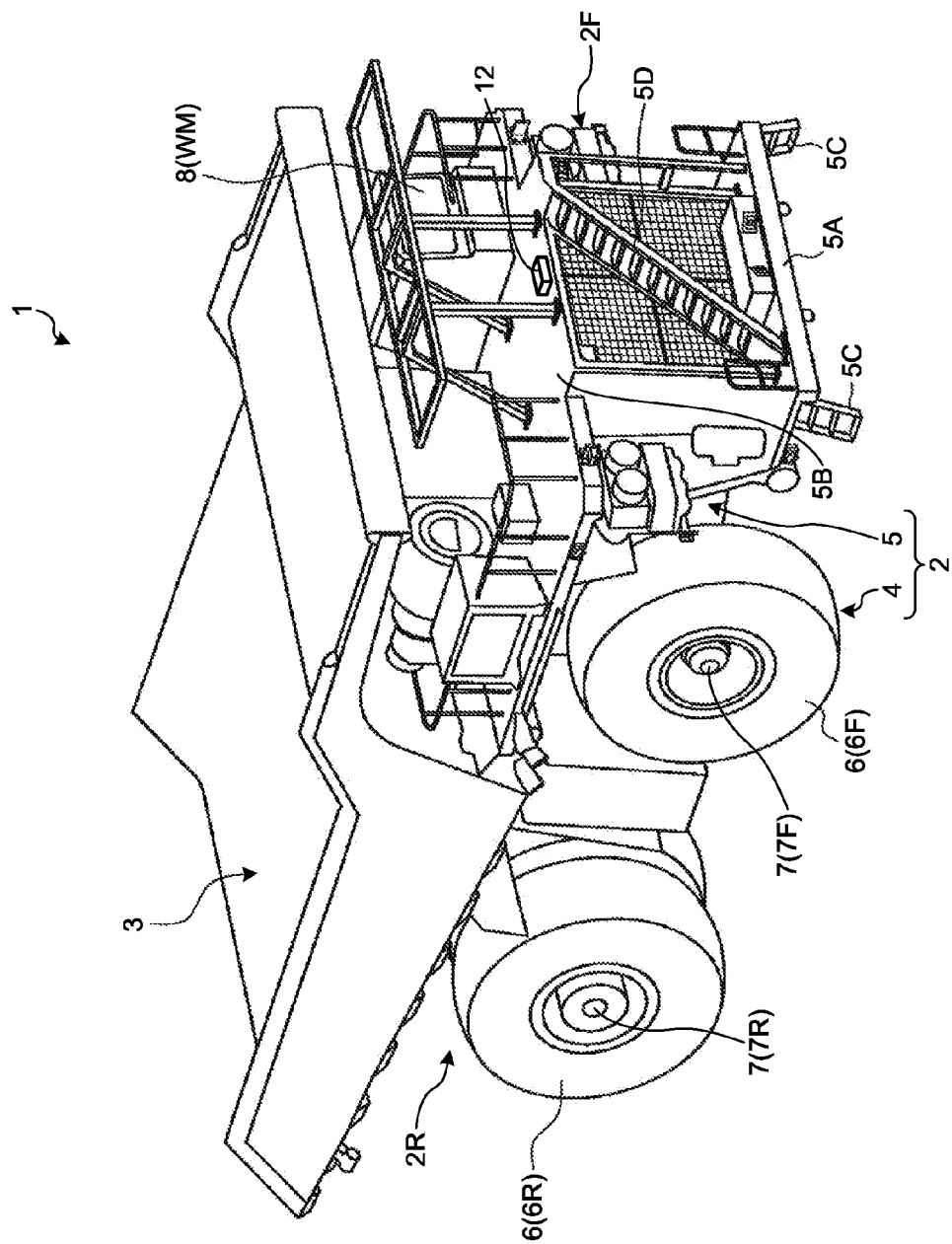
FIG. 2 is a perspective view illustrating an example of a transporter vehicle.

Next, the dump truck 1 will be described. FIG. 2 is a perspective view illustrating an example of the dump truck 1 according to the embodiment.

The dump truck 1 is a manned dump truck which is operated by an operator WM sitting in a cab (a driving room) 8. The dump truck 1 may be referred to as an off-highway truck. The dump truck 1 is a rigid dump truck.

The dump truck 1 includes the vehicle 2 which includes a front part 2F and a rear part 2R and the vessel 3 which is provided in the vehicle 2. The vehicle 2 includes a traveling device 4 and a vehicle body 5 of which at least a part is disposed above the traveling device 4. The vessel 3 is supported by the vehicle body 5.

The traveling device 4 includes a vehicle wheel 6 and an axle 7 which rotatably supports the vehicle wheel 6. The vehicle wheel 6 includes a wheel which is supported by the axle 7 and a tire which is supported by the wheel. The vehicle wheel 6 includes a front wheel 6F and a rear wheel 6R. The axle 7 includes an axle 7F which rotatably supports the front wheel 6F and an axle 7R which rotatably supports the rear wheel 6R.

The vehicle body 5 includes a lower deck 5A, an upper deck 5B, a movable ladder 5C which is disposed below the lower deck 5A, and a ladder 5D which is disposed so as to connect the lower deck 5A and the upper deck 5B. The lower deck 5A is disposed at the lower portion of the front part of the vehicle body 5. The upper deck 5B is disposed above the lower deck 5A in the front part of the vehicle body 5.

The vehicle 2 includes a cab 8. The cab 8 is disposed on the upper deck 5B. The operator WM sits in the cab 8, and operates the dump truck 1. The operator WM may be elevated with respect to the cab 8 by using the ladder 5C. The operator WM may move between the lower deck 5A and the upper deck 5B by using the ladder 5D.

The vessel 3 is a member on which a load is loaded. The vessel 3 may be elevated in the vertical direction with respect to the vehicle 2 by an elevation device. The elevation device includes an actuator such as a hydraulic cylinder (a hoist cylinder) disposed between the vessel 3 and the vehicle body 5. When a part of the vessel 3 is moved upward by the elevation device, the load of the vessel 3 is discharged.

(Cab)

Figure 3:
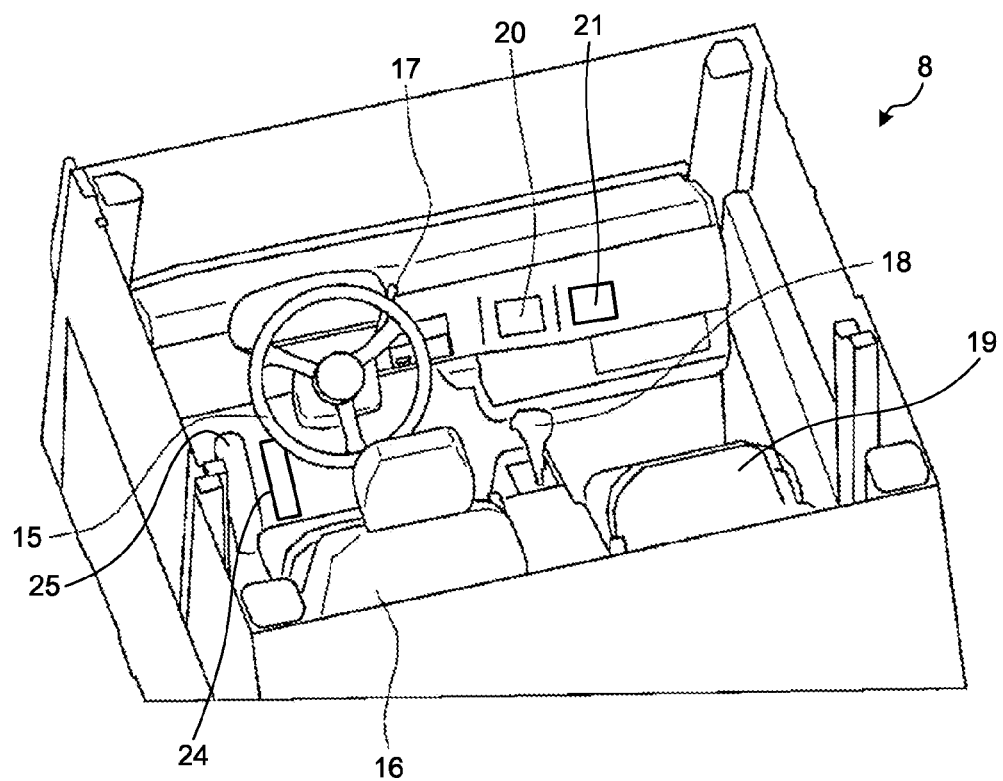
FIG. 3 is a view illustrating an example of a cab.

Next, the cab 8 will be described. FIG. 3 is a view illustrating an example of the cab 8 according to the embodiment. As illustrated in FIG. 3, the cab 8 is provided with a driver seat 16, a trainer seat 19, an output operation unit 24, a brake operation unit 25, a traveling direction operation unit 15, a speed stage operation unit 18, a retarder operation unit 17, a display device 20 such as a flat panel display, and an alarm device 21 which generates an alarm.

(Collision Prevention System)

Next, a collision prevention system 300S according to the embodiment will be described. In the embodiment, the dump truck 1 includes the collision prevention system 300S capable of performing a process for reducing damage caused by the collision between the dump truck 1 and an object in front of the dump truck 1.

Figure 4:
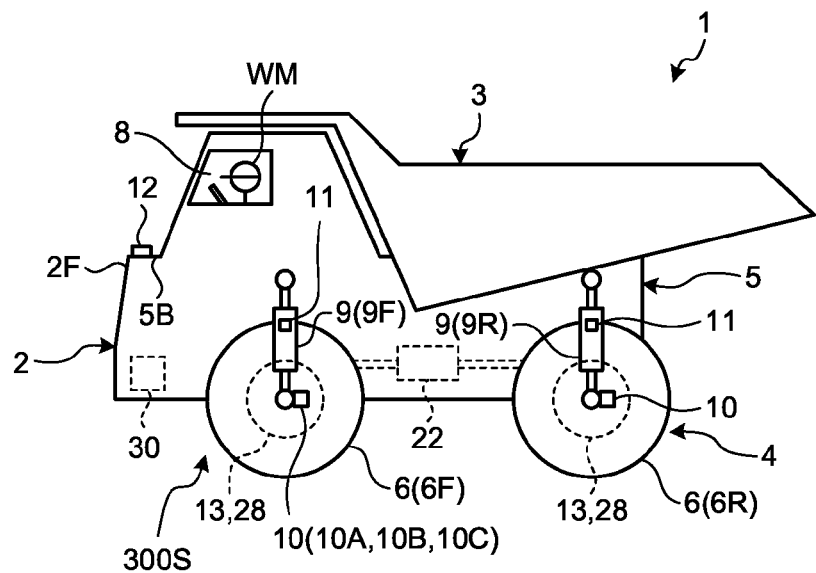
FIG. 4 is a schematic view illustrating an example of the transporter vehicle.
Figure 5:
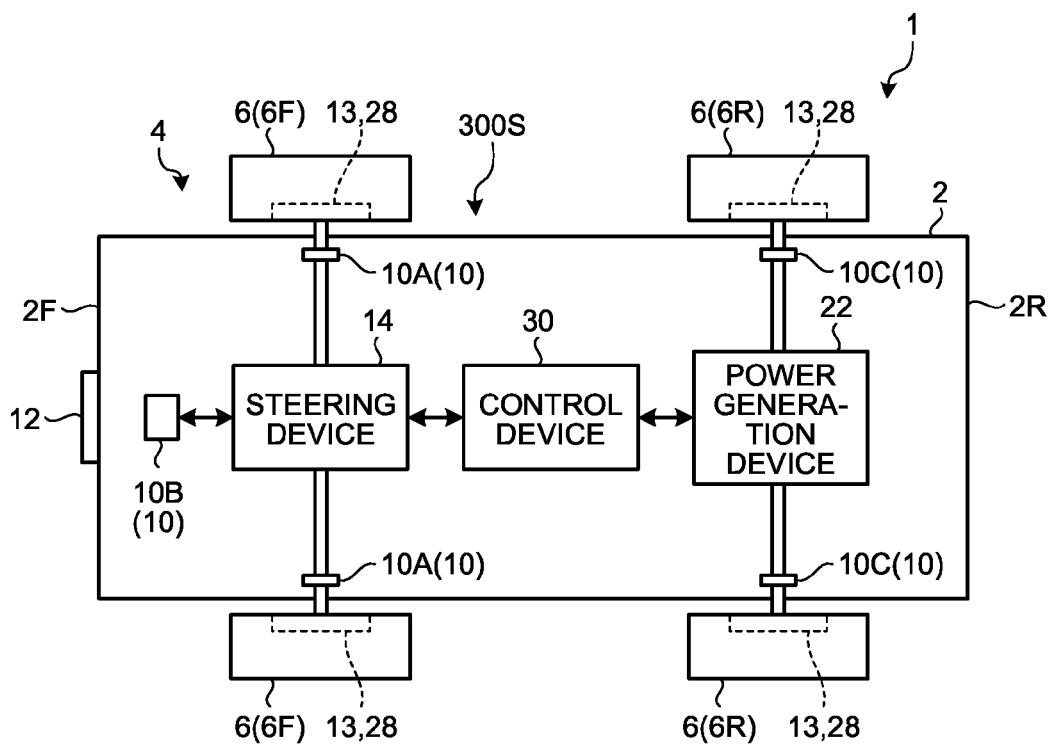
FIG. 5 is a schematic view illustrating an example of the transporter vehicle.
Figure 9:
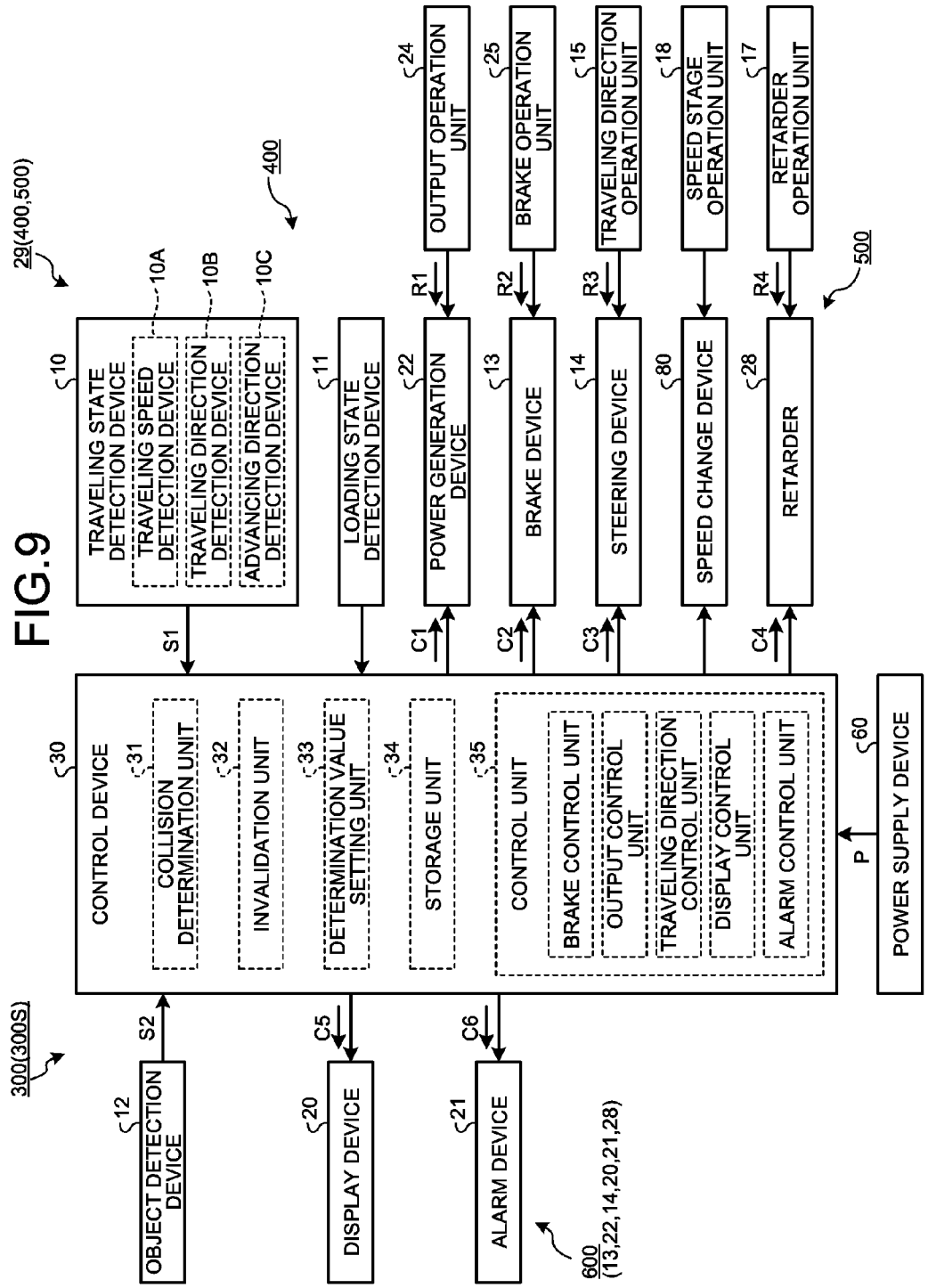
FIG. 9 is a functional block diagram illustrating an example of a control system.

FIGS. 4 and 5 are schematic views illustrating an example of the dump truck 1 according to the embodiment. Furthermore, a speed change device 80 illustrated in FIG. 9 is not illustrated in FIG. 5. The dump truck 1 includes a traveling state detection device 10 which detects the traveling state of the dump truck 1 (the vehicle 2), a loading state detection device 11 which detects the loading state of the load of the vessel 3, an object detection device 12 which detects an object in front of the dump truck 1 (the vehicle 2), and a control device 30 which controls the dump truck 1. The collision prevention system 300S includes the object detection device 12. The detection result of the traveling state detection device 10, the detection result of the loading state detection device 11, and the detection result of the object detection device 12 are output to the control device 30. The control device 30 performs a process for preventing the collision between the dump truck 1 and the object based on the detection results.

The traveling state of the dump truck 1 includes at least one of the traveling speed of the dump truck 1, the traveling direction (the direction of the front part 2F or the front wheel 6F) of the dump truck 1, and the advancing direction (the forward or backward movement direction) of the dump truck 1.

The loading state of the load of the vessel 3 includes at least one of a state whether a load is loaded on the vessel 3 and the weight of the load.

The dump truck 1 includes a power generation device 22 which generates a power, a suspension cylinder 9 of which at least a part is connected to the traveling device 4, and a brake device 13 which stops the traveling device 4.

The traveling device 4 is driven by the power generated by the power generation device 22. In the embodiment, the power generation device 22 drives the traveling device 4 in an electrical drive manner. The power generation device 22 includes an internal-combustion engine such as a diesel engine, a generator which is operated by the power of the internal-combustion engine, and a motor which is operated by the power generated by the generator. The power which is generated by the motor is transmitted to the vehicle wheel 6 of the traveling device 4. Accordingly, the traveling device 4 is driven. The self-traveling operation of the dump truck 1 is performed by the power of the power generation device 22 provided in the vehicle 2.

Furthermore, the power generation device 22 may drive the traveling device 4 in a mechanical drive manner. For example, the power which is generated by the internal-combustion engine may be transmitted to the vehicle wheel 6 of the traveling device 4 through a power transmission device.

The traveling device 4 includes a steering device 14 which changes the traveling direction (the direction of the front part 2F) of the dump truck 1. The steering device 14 changes the traveling direction of the dump truck 1 by changing the direction of the front wheel 6F.

The power generation device 22 is operated by the output operation unit 24 provided in the cab 8. The output operation unit 24 includes a pedal operation unit such as an accelerator pedal. The operator WM may adjust the output of the power generation device 22 by operating the output operation unit 24. When the output of the power generation device 22 is adjusted, the traveling speed of the dump truck 1 is adjusted.

The brake device 13 is operated by the brake operation unit 25 provided in the cab 8. The brake operation unit 25 includes a pedal operation unit such as a brake pedal. The operator WM may operate the brake device 13 by operating the brake operation unit 25. When the brake device 13 is operated, the traveling speed of the dump truck 1 is adjusted.

The steering device 14 is operated by the traveling direction operation unit 15 provided in the cab 8.

The traveling direction operation unit 15 is, for example, a handle, and includes a handle operation unit. The operator WM may operate the steering device 14 by operating the traveling direction operation unit 15. When the steering device 14 is operated, the traveling direction of the dump truck 1 is adjusted.

Further, the speed change device 80 is, for example, a transmission, and is operated by the speed stage operation unit 18 provided in the cab 8. The speed stage operation unit 18 includes a lever operation unit such as a shift lever. The operator WM may change the advancing direction of the traveling device 4 by operating the speed stage operation unit 18. When the speed stage operation unit 18 is operated, the speed change device 80 changes the rotation direction in order to cause the dump truck 1 to move forward or backward.

The suspension cylinder 9 is disposed between the vehicle wheel 6 and the vehicle body 5. The suspension cylinder 9 includes a suspension cylinder 9F which is disposed between the front wheel 6F and the vehicle body 5 and a suspension cylinder 9R which is disposed between the rear wheel 6R and the vehicle body 5. That is, the suspension cylinder 9 is provided in each of four vehicle wheels 6 disposed at the front, rear, left, and right positions. A load based on the weight of the vehicle body 5 and the load acts on the vehicle wheel 6 through the suspension cylinder 9.

The traveling state detection device 10 includes a traveling speed detection device 10A which detects the traveling speed of the dump truck 1, a traveling direction detection device 10B which detects the traveling direction of the dump truck 1, and an advancing direction detection device 10C which detects whether the dump truck 1 moves forward or backward.

The traveling speed detection device 10A detects the traveling speed of the dump truck 1 (the vehicle 2). The traveling speed detection device 10A includes a rotation speed sensor which detects the rotation speed of the vehicle wheel 6 (the axle 7). The rotation speed of the vehicle wheel 6 is involved with the traveling speed of the dump truck 1. The detection value (the rotation speed value) of the rotation speed sensor is converted into the traveling speed value of the dump truck 1. The traveling speed detection device 10A detects the traveling speed of the dump truck 1 based on the detection value of the rotation speed sensor.

The traveling direction detection device 10B detects the traveling direction of the dump truck 1 (the vehicle 2). The traveling direction of the dump truck 1 includes the direction of the front part (the front surface) 2F of the vehicle 2 when the dump truck 1 moves forward. The traveling direction of the dump truck 1 includes the direction of the front wheel 6F when the dump truck 1 moves forward.

The advancing direction detection device 10C detects the advancing direction of the dump truck 1 (the vehicle 2). The advancing direction detection device 10C detects whether the dump truck 1 moves forward or backward.

When the dump truck 1 moves forward, the front part 2F of the vehicle 2 is located at the front side in the advancing direction. When the dump truck 1 moves backward, the rear part 2R of the vehicle 2 is located at the front side in the advancing direction. The advancing direction detection device 10C includes a rotation direction sensor which detects the rotation direction of the vehicle wheel 6 (the axle 7). The advancing direction detection device 10C detects whether the dump truck 1 moves forward or backward based on the detection value of the rotation direction sensor. Furthermore, the advancing direction detection device 10C may include a sensor which detects the operation state of the speed stage operation unit 18.

The loading state detection device 11 detects at least one of a state whether a load is loaded on the vessel 3 and the weight of the load. The loading state detection device 11 includes a weight sensor which detects the weight of the vessel 3. The weight of the empty vessel 3 is given information. The loading state detection device 11 may obtain the weight of the load loaded on the vessel 3 based on the detection value of the weight sensor and the weight value of the empty vessel 3 as given information. That is, the weight of the load may be obtained by subtracting the weight value of the vessel 3 from the detection value.

In the embodiment, the weight sensor of the loading state detection device 11 includes a pressure sensor which detects the pressure of the working oil in the space inside the suspension cylinder 9. The pressure sensor detects a load acting on the suspension cylinder 9 by detecting the pressure of the working oil. The suspension cylinder 9 includes a cylinder portion and a piston portion which is movable relative to the cylinder portion. The working oil is enclosed in the inner space between the cylinder portion and the piston portion. When a load is loaded on the vessel 3, the cylinder portion and the piston portion move relatively so that the pressure of the working oil in the inner space increases. When a load is discharged from the vessel 3, the cylinder portion and the piston portion move relatively so that the pressure of the working oil in the inner space decreases. The pressure sensor detects the pressure of the working oil. The pressure of the working oil is involved with the weight of the load. The detection value (the pressure value) of the pressure sensor is converted into the weight value of the load. The loading state detection device 11 detects the weight of the load based on the detection value of the pressure sensor (the weight sensor).

In the embodiment, the pressure sensor is disposed in each of the plurality of suspension cylinders 9. The dump truck 1 includes four vehicle wheels 6. The pressure sensor is disposed in each of the suspension cylinders 9 provided in four vehicle wheels 6. The loading state detection device 11 may obtain the weight of the load based on the sum value or the average value of the detection values of four pressure sensors. The loading state detection device 11 may obtain the weight of the load based on the detection value of a specific pressure sensor (for example, the pressure sensor disposed in the suspension cylinder 9R) among four pressure sensors.

Furthermore, the load transportation amount of the dump truck 1 per unit time may be managed based on the detection result of the pressure sensor (the weight sensor) of the loading state detection device 11. For example, the load transportation amount (the working amount) of the dump truck 1 for one day may be stored in a storage device mounted on the dump truck 1 and managed based on the detection result of the pressure sensor.

Furthermore, the loading state detection device 11 may be configured as a weight sensor disposed between the vessel 3 and the vehicle body 5. The weight sensor may be a strain gauge type load cell provided between the vessel 3 and the vehicle body 5. The loading state detection device 11 may be configured as a pressure sensor which detects the hydraulic pressure of the hydraulic cylinder (the hoist cylinder) raising the vessel 3.

The object detection device 12 detects an object existing in front of the dump truck 1 (the vehicle 2) in a non-contact state. The object detection device 12 includes a radar device (a millimeter wave radar device). The radar device may detect not only a state whether the object exists at the front side, but also the relative position (the relative distance and the orientation) of the object and the relative speed of the object by sending an electric wave (or an ultrasonic wave) and receiving the electric wave (or the ultrasonic wave) reflected from the object. Furthermore, the object detection device 12 may include at least one of a laser scanner and a three-dimensional distance sensor. Further, the object detection devices 12 may be provided at a plurality of positions.

The object detection device 12 is disposed in the front part 2F of the vehicle 2. In the embodiment, as illustrated in FIG. 2, the object detection device 12 is disposed in the upper deck 5B. Furthermore, the object detection device 12 may detect the object in front of the dump truck 1. The object detection device 12 may be disposed in the lower deck 5A.

Furthermore, since the upper deck 5B is provided with the object detection device 12, it is possible to prevent a problem in which an unevenness existing on a road surface (a ground surface) contacting the vehicle wheel 6 is erroneously detected as an object by the object detection device 12 even when the unevenness exists. Furthermore, when an electric wave is emitted from the radar device, the strength of the electric wave reflected from the unevenness of the road surface is smaller than the strength of the electric wave reflected from the object as the detection target. The laser device may include a filter device which receives a large-strength electric wave and cuts a low-strength electric wave so that the electric wave reflected from the object is received and the electric wave reflected from the unevenness of the road surface is not erroneously detected.

Figure 6:
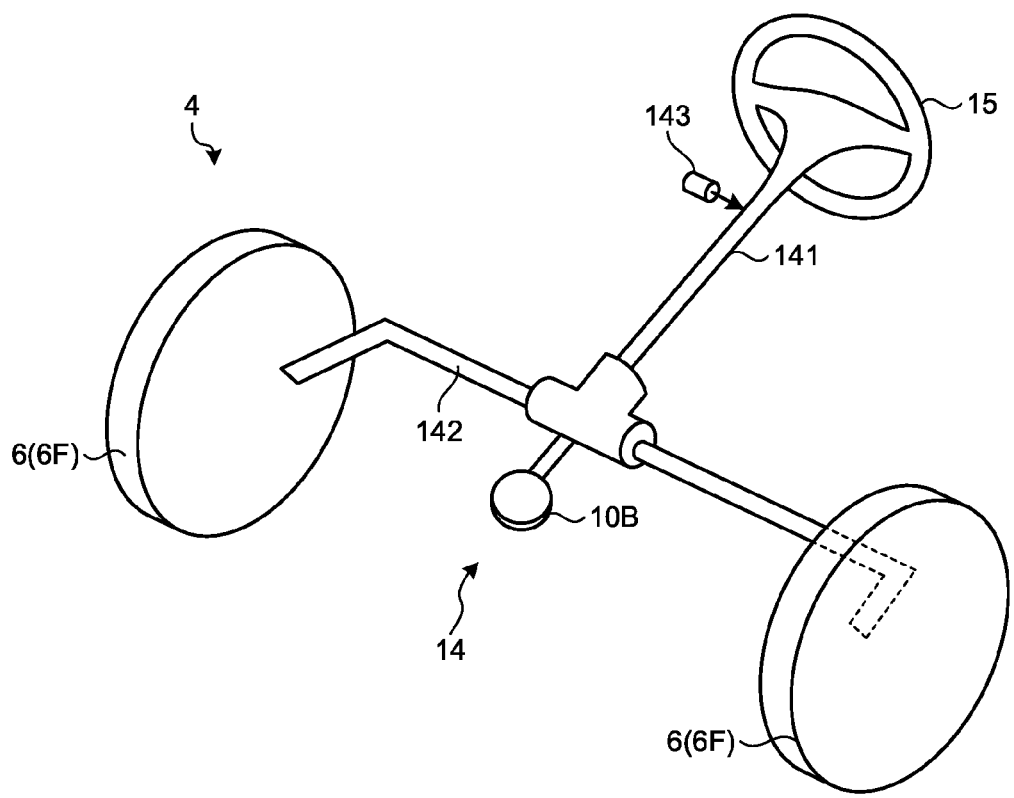
FIG. 6 is a schematic view illustrating an example of a steering device and a traveling direction detection device.
Figure 7:
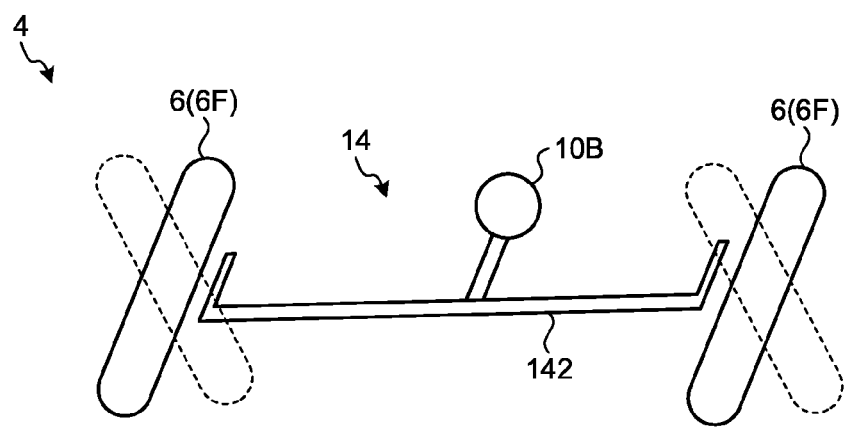
FIG. 7 is a schematic view illustrating an example of the steering device and the traveling direction detection device.

FIGS. 6 and 7 are schematic views illustrating an example of the steering device 14 and the traveling direction detection device 10B. The steering device 14 is provided in the traveling device 4, and is used to steer the traveling device 4. The traveling device 4 may travel in a linear movement state. The traveling device 4 may travel in a non-linear movement state (a swing state). By the operation of the steering device 14, the traveling direction of the traveling device 4 may be changed so as to switch the linear movement state and the non-linear movement state. The steering device 14 changes the traveling direction of the traveling device 4 (the dump truck 1) by changing the direction of the front wheel 6F. FIG. 7 illustrates a state where the traveling device 4 is in the non-linear movement state (the swing state). When the front wheel 6F is aligned to the direction indicated by the solid line, the dump truck 1 swings right. Meanwhile, when the front wheel 6F is aligned to the direction indicated by the dashed line, the dump truck 1 swings left.

The steering device 14 includes a column 141 which is connected to the traveling direction operation unit (the handle operation unit) 15 and rotates along with the traveling direction operation unit 15 and a directing member 142 which is connected to the vehicle wheel 6 (the front wheel 6F) and changes the direction of the vehicle wheel 6 in response to the operation amount of the traveling direction operation unit 15. When the steering device 14 is operated by the operation of the traveling direction operation unit 15 from the operator WM, the traveling direction of the dump truck 1 is adjusted.

The traveling direction detection device 10B detects the operation amount of the steering device 14 and detects the steering angle. The traveling direction detection device 10B includes a steering sensor which detects the steering angle of the steering device 14. The steering sensor includes a potentiometer which rotates along with the directing member 142 and outputs a detection signal (an electric signal) in response to the steering angle. The traveling direction detection device 10B detects the traveling direction of the dump truck 1 by using the steering sensor.

The traveling direction detection device 10B detects the change amount in the traveling direction from the linear movement state of the traveling device 4. When the steering angle of the traveling device 4 is 0° (the reference angle) in the linear movement state, the traveling direction detection device 10B detects the change amount in the steering angle from the reference angle. A change amount in the steering angle with respect to the reference angle is involved with the change amount in the traveling direction of the dump truck 1 from the linear movement state. The traveling direction detection device 10B may obtain the change amount in the traveling direction of the dump truck 1 from the linear movement state based on the detected change amount in the steering angle.

The traveling direction detection device 10B may include a rotation amount sensor 143 which detects the rotation amount of the traveling direction operation unit 15 (or the column 141). The rotation amount of the traveling direction operation unit 15 is involved with the change amount in the traveling direction of the dump truck 1 from the linear movement state. The traveling direction detection device 10B may obtain the change amount in the traveling direction of the dump truck 1 based on the detected rotation amount of the traveling direction operation unit 15.

Figure 8:
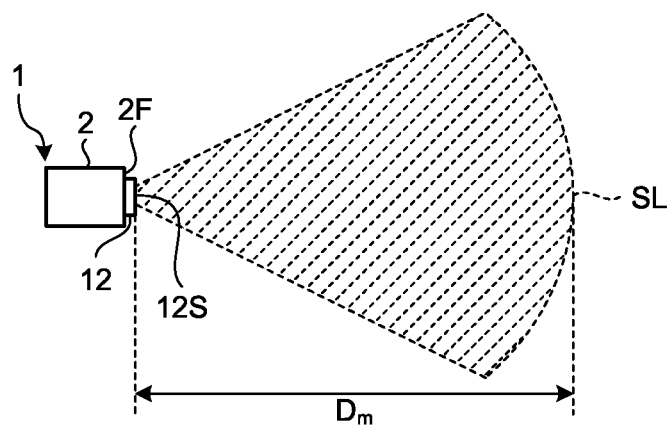
FIG. 8 is a schematic view illustrating an example of an object detection device.

FIG. 8 is a schematic view illustrating an example of the object detection device 12 according to the embodiment. As illustrated in FIG. 8, the object detection device 12 includes a radar device (a millimeter wave radar device) which is disposed in the front part 2F of the vehicle 2. The radar device includes a detection area SL capable of detecting an object in front of the dump truck 1. The detection area SL includes a radial area which extends from an emission portion 12S in the vertical and width directions as indicated by the diagonal line of FIG. 8. The object detection device 12 may detect an object disposed in the detection area SL. In the traveling direction of the dump truck 1, the dimension of the detection area SL of the object detection device 12 is indicated by Dm. The dimension Dm is a distance between the front end of the detection area SL and the emission portion 12S of the object detection device 12 emitting at least one of an electric wave and an ultrasonic wave. When the object detection device 12 detects an object, a detection signal obtained by detecting the object is output to the control device 30.

(Control System)

Next, an example of a control system 300 of the dump truck 1 according to the embodiment will be described. FIG. 9 is a functional block diagram illustrating an example of the control system 300 according to the embodiment. The control system 300 includes the collision prevention system 300S.

As illustrated in FIG. 9, the control system 300 includes the control device 30 which controls the dump truck 1 and a vehicle control device 29 which is connected to the control device 30. The vehicle control device 29 includes a state quantity detection system 400 which detects the state quantity of the dump truck 1 and a traveling condition adjustment system 500 which adjusts the traveling condition of the dump truck 1. The state quantity detection system 400 includes, for example, the traveling state detection device 10 and the loading state detection device 11. The traveling condition adjustment system 500 includes, for example, the power generation device 22, the brake device 13, the traveling device 4 (the steering device 14), and a retarder 28. The object detection device 12, the display device 20, the alarm device 21, and a power supply device (the power supply unit) 60 are connected to the control device 30. Furthermore, the brake device 13 and the retarder 28 are both braking devices which perform a brake process for decelerating or stopping the dump truck 1.

The output operation unit 24 is connected to the power generation device 22. The brake operation unit 25 is connected to the brake device 13. The traveling direction operation unit 15 is connected to the steering device 14. The speed stage operation unit 18 is connected to the traveling device 4. The retarder operation unit 17 is connected to the retarder 28. Furthermore, in the embodiment, the braking device configured as the retarder 28 and the braking device configured as the brake device 13 correspond to a common braking device mechanism, and a braking operation may be performed by the common braking device even when the operator WM operates the brake operation unit 25 or the retarder operation unit 17. Furthermore, the retarder 28 controls the braking force so that the dump truck 1 travels at a constant speed when the dump truck moves down along a sloping road. When the dump truck moves down along the sloping road, the braking device exhibits a predetermined braking force by the operation of the retarder 28 using the retarder operation unit 17 operated by the operator WM. Further, the retarder 28 adjusts the braking force of the braking device in response to the traveling speed detected by the traveling speed detection device 10A. Furthermore, the retarder 28 may be configured as a braking device different from the brake device 13. For example, the braking device may include a fluid type retarder or an electromagnetic type retarder.

The control device 30 includes a numerical calculator such as a CPU (Central Processing Unit) or a storage device such as a memory. The control device 30 includes a collision determination unit 31 which determines the possibility of the collision between the dump truck 1 and the object in front of the dump truck 1, a determination value setting unit 33 which sets a determination value SV related to the change amount in the traveling direction of the dump truck 1 from the linear movement state, an invalidation unit 32 which invalidates at least a part of the process (the function) of the collision prevention system 300S, and a control unit 35 which outputs a control signal C for reducing damage caused by the collision.

The control device 30 includes a storage unit 34 which stores information used to determine the possibility of the collision. The storage unit 34 includes at least one of a RAM (Random Access Memory), a ROM (Read Only Memory), a flash memory, and a hard disk.

The traveling state detection device 10 detects the traveling state of the dump truck 1 and outputs the detection result to the collision determination unit 31. The loading state detection device 11 detects the loading state of the load of the vessel 3 and outputs the detection result to the collision determination unit 31. The object detection device 12 detects the object in front of the dump truck 1 and outputs the detection result to the collision determination unit 31.

In the embodiment, the collision prevention system 300S includes the object detection device 12, the collision determination unit 31, the control unit 35, and the power supply device 60. The object detection device 12 detects the object in front of the dump truck 1 and outputs a detection signal S2 to the collision determination unit 31. The collision determination unit 31 determines the possibility of the collision between the dump truck 1 and the object based on the detection result of the object detection device 12. In the embodiment, the collision determination unit 31 determines the possibility of the collision between the dump truck 1 and the object based on the detection result of the traveling state detection device 10, the detection result of the loading state detection device 11, and the detection result of the object detection device 12. The control unit 35 outputs the control signal C for reducing damage caused by the collision based on the determination result of the collision determination unit 31. The power supply device 60 outputs a power P for operating at least a part of the collision prevention system 300S.

The traveling direction detection device 10B detects the change amount in the traveling direction of the dump truck 1 and outputs a detection signal S1. The invalidation unit 32 invalidates at least a part of the process of the collision prevention system 300S based on the determination value SV set by the determination value setting unit 33 and the detection value DV of the change amount in the traveling direction of the dump truck 1 from the linear movement state detected by the traveling direction detection device 10B. The invalidation unit 32 invalidates at least a part of the output from the collision prevention system 300S. In the collision prevention system 300S of the embodiment, any device constituting the collision prevention system 300S outputs the detection signal S2, the control signal C, and the power P. The invalidation unit 32 invalidates at least one of the detection signal S2 output from the object detection device 12, the control signal C output from the control unit 35, and the power P output from the power supply device 60 based on the determination value SV and the detection value DV of the change amount in the traveling direction of the dump truck 1 from the linear movement state.

The dump truck 1 includes a process system 600 which is operated to reduce damage caused by the collision with the object. The process system 600 includes a plurality of process devices capable of performing different processes for reducing damage caused by the collision between the dump truck 1 and the object. In the embodiment, the process device of the process system 600 includes, for example, at least one of the brake device 13, the power generation device 22, the steering device 14, the display device 20, and the alarm device 21. The brake device 13, the power generation device 22, the steering device 14, the display device 20, the retarder 28, and the alarm device 21 may respectively perform different processes for reducing damage caused by the collision. The process system 600 is controlled by the control device 30.

The brake device 13 may decrease the traveling speed of the dump truck 1 or stop the traveling dump truck 1 by performing a brake process (a stop process) on the traveling device 4. Accordingly, damage caused by the collision between the dump truck 1 and the front object is reduced.

The power generation device 22 may decrease the traveling speed of the dump truck 1 by performing an output reduction process for reducing the output (the driving force) with respect to the traveling device 4. Accordingly, damage caused by the collision between the dump truck 1 and the front object is reduced.

The steering device 14 changes the traveling direction of the dump truck 1 so that an object does not exist on the traveling road of the dump truck 1 by performing the traveling direction change process of the dump truck 1 in response to a control signal C3 from the control unit (the traveling direction control unit) 35 or an operation signal R3 from the traveling direction operation unit 15. Accordingly, damage caused by the collision between the dump truck 1 and the front object is reduced.

The display device 20 may perform, for example, a display process for refreshing the attention of the operator WM. The display device 20 may generate an alarm for the operator WM by displaying an alarm image. The alarm image may be, for example, a display of an alarm mark or a massage for notifying the possibility of the collision with the object existing at the front side. Accordingly, an operation for reducing damage caused by the collision by the operator WM, for example, an operation of at least one of the output operation unit 24, the brake operation unit 25, and the traveling direction operation unit 15 is performed, and hence damage caused by the collision between the dump truck 1 and the front object is reduced.

The alarm device 21 may perform an alarm generation process for refreshing the attention of the operator WM. The alarm device 21 may generate an alarm for the operator WM by making a sound or light for notifying the possibility of the collision with the object existing at the front side by using, for example, a speaker or a lamp. The alarm device 21 may include a vibration generation device capable of generating an alarm for the operator WM by vibrating at least one of the traveling direction operation unit 15 and the driver seat 16. The alarm device 21 may include a seat belt adjustment device capable of generating an alarm for the operator WM by changing the binding force of the seat belt used to protect the operator WM sitting on the driver seat 16. Accordingly, an operation for reducing damage caused by the collision is performed by the operator WM, and hence damage caused by the collision between the dump truck 1 and the front object is reduced.

The control unit 35 outputs the control signal C for reducing damage caused by the collision to the process system 600 (at least one of the brake device 13, the power generation device 22, the steering device 14, the display device 20, the retarder 28, and the alarm device 21) based on the determination result of the collision determination unit 31. The process system 600 to which the control signal C is supplied from the control unit 35 performs a process for reducing damage caused by the collision between the dump truck 1 and the object.

When it is determined that there is a high possibility that the dump truck 1 and the object may collide with each other, the control unit (the output control unit) 35 may output the control signal C1 to the power generation device 22 so that the output reduction process is performed. The power generation device 22 reduces the output based on the control signal C1 supplied from the control unit 35 and reduces the driving force with respect to the traveling device 4. Accordingly, the traveling speed of the dump truck 1 is decreased, and hence damage caused by the collision between the dump truck 1 and the object is reduced.

When it is determined that there is a high possibility that the dump truck 1 and the object may collide with each other, the control unit (the brake control unit) 35 may output the control signal C2 to the brake device 13 so that the brake process is performed.

The brake device 13 is operated based on the control signal C2 supplied from the control unit 35. Accordingly, the traveling speed of the dump truck 1 is decreased or the traveling dump truck 1 is stopped, and hence damage caused by the collision between the dump truck 1 and the object is reduced.

When it is determined that there is a high possibility that the dump truck 1 and the object may collide with each other, the control unit (the traveling direction control unit) 35 may output the control signal C3 to the steering device 14 so that the traveling direction change process is performed. The steering device 14 is operated based on the control signal C3 supplied from the control unit 35. Accordingly, the traveling direction of the dump truck 1 is changed so that an object does not disposed in the traveling road of the dump truck 1, and hence damage caused by the collision between the dump truck 1 and the object is reduced.

When it is determined that there is a high possibility that the dump truck 1 and the object may collide with each other, the control unit (the alarm control unit) 35 may output a control signal C6 to the alarm device 21 so that the alarm generation process is performed. As described above, the alarm device 21 is operated based on the control signal C6 supplied from the control unit 35. The alarm device 21 generates a sound or light for refreshing the attention of the operator WM. Accordingly, any operation for reducing damage caused by the collision by the operator WM is performed, and the operation signals R (R1, R2, R3, and R4) caused by the operation are supplied to the process system 600. Accordingly, damage caused by the collision between the dump truck 1 and the object is reduced.

When it is determined that there is a high possibility that the dump truck 1 and the object may collide with each other, the control unit (the display control unit) 35 may output a control signal C5 to the display device 20 so that the display process is performed as described above. The display device 20 is operated based on the control signal C5 supplied from the control unit 35. The display device 20 displays an image for refreshing the attention of the operator WM. Accordingly, any operation for reducing damage caused by the collision by the operator WM is performed, and the operation signals R (R1, R2, R3, and R4) caused by the operation are supplied to the process system 600. Accordingly, damage caused by the collision between the dump truck 1 and the object is reduced.

The operation for reducing damage caused by the collision performed by the operator WM includes at least one of the operation of the output operation unit 24 for reducing the output of the power generation device 22, the operation of the brake operation unit 25 for operating the brake device 13, the operation of the retarder operation unit 17 for operating the retarder 28, and the operation of the traveling direction operation unit 15 for changing the traveling direction of the dump truck 1 by the steering device 14. When the output operation unit 24 is operated, the operation signal R1 is generated. The output of the power generation device 22 is reduced based on the operation signal R1 generated by the output operation unit 24. When the brake operation unit 25 is operated, the operation signal R2 is generated. The brake device 13 is operated based on the operation signal R2 generated by the brake operation unit 25, and hence the dump truck 1 is decelerated. When the traveling direction operation unit 15 is operated, the operation signal R3 is generated. The steering device 14 is operated based on the operation signal R3 generated by the traveling direction operation unit 15. When the retarder operation unit 17 is operated, the operation signal R4 is generated. The retarder 28 is operated based on the operation signal R4 generated by the retarder operation unit 17, and hence the dump truck 1 is decelerated.

The power generation device 22 is connected to each of the output control unit 35 and the output operation unit 24. The output operation unit 24 generates the operation signal R1 in response to the operation amount of the operator WM, and supplies the operation signal to the power generation device 22. The power generation device 22 generates an output based on the operation signal R1. The output control unit 35 generates the control signal C1 for controlling the power generation device 22, and supplies the control signal to the power generation device 22. The power generation device 22 generates an output based on the control signal C1.

The retarder 28 is connected to each of the retarder operation unit 17 and the brake control unit 35. The retarder operation unit 17 generates the operation signal R4 in response to the operation of the operator WM, and supplies the operation signal to the retarder 28. The retarder 28 generates a braking force based on the operation signal R4. The brake control unit 35 generates a control signal C4 for controlling the retarder 28, and supplies the control signal to the retarder 28. The retarder 28 generates a braking force based on the control signal C4.

The brake device 13 is connected to each of the brake operation unit 25 and the brake control unit 35. The brake operation unit 25 generates the operation signal R2 in response to the operation amount of the operator WM, and supplies the operation signal to the brake device 13. The brake device 13 generates a braking force based on the operation signal R2. The brake control unit 35 generates the control signal C4 or the control signal C2 for controlling the retarder 28 or the brake device 13, and supplies the control signal to the retarder 28 or the brake device 13. The retarder 28 generates a braking force based on the control signal C4. The brake device 13 generates a braking force based on the control signal C2. In the description below, a case will be described in which the brake control unit 35 generates only the control signal C4 with respect to the retarder 28 when it is determined that there is a high possibility that the dump truck 1 and the object may collide with each other due to the existence of the object in front of the dump truck 1.

The steering device 14 is connected to each of the traveling direction operation unit 15 and the traveling direction control unit 35. The traveling direction operation unit 15 generates the operation signal R3 in response to the operation amount of the operator WM, and supplies the operation signal to the steering device 14. The steering device 14 changes the direction of the front wheel 6F so that the traveling direction of the traveling device 4 is changed based on the operation signal R3. The traveling direction control unit 35 generates the control signal C3 for controlling the steering device 14, and supplies the control signal to the steering device 14. The steering device 14 changes the direction of the front wheel 6F so that the traveling direction of the traveling device 4 is changed based on the control signal C3.

(Collision Possibility Determination Method)

Next, an example of a method of determining the possibility of the collision between the dump truck 1 and the object will be described. In the embodiment, an example of a method of determining the possibility of the collision between the object existing in front of the dump truck 1 and the dump truck 1 will be mainly described along with the dump truck 1. In the description below, the object is assumed as the other dump truck 1F existing in front of the dump truck 1. In the embodiment, an example of a method of determining the possibility of the crash between the dump truck 1 and the dump truck 1F in front of the dump truck 1 will be mainly described. In the description below, the dump truck 1F in front of the dump truck 1 is appropriately referred to as the front dump truck 1F.

The loading state of the load of the vessel 3 is detected by the loading state detection device 11. The detection result of the loading state detection device 11 is output to the control device 30. The control device 30 acquires the detection result of the loading state detection device 11. In the embodiment, the loading state of the load of the vessel 3 includes a state whether a load exists in the vessel 3. The control device 30 determines whether a load exists in the vessel 3.

Next, the deceleration a of the dump truck 1 (the vehicle 2) is set based on the loading state of the load of the vessel 3 by the control device 30. The deceleration a of the dump truck 1 indicates the deceleration (the negative acceleration) of the dump truck 1 when the retarder 28 is operated. In the embodiment, the deceleration a of the dump truck 1 indicates the deceleration of the dump truck 1 when the braking device is operated so that the maximum braking capability of the braking device including the retarder 28 is exhibited. Furthermore, the deceleration a of the dump truck 1 may be a deceleration capable of exhibiting the braking capability within the range where the slip of the dump truck 1 may be suppressed. In general, the deceleration a is small when the weight of the dump truck 1 is large. Meanwhile, the deceleration a is large when the weight of the dump truck 1 is small. When the deceleration a is small, it is difficult to stop the traveling dump truck 1. When the deceleration a is large, it is easy to stop the traveling dump truck 1. In the description below, the state where the retarder 28 is operated so that the maximum braking capability of the retarder 28 is exhibited is appropriately referred to as a full brake state.

The information on the relation between the weight of the dump truck 1 and the deceleration a of the dump truck 1 of the weight may be obtained in advance by an experiment or a simulation. The storage unit 34 stores the information on the relation between the weight of the load and the deceleration a of the dump truck 1 obtained by an experiment or a simulation. In the embodiment, the storage unit 34 stores the deceleration a1 of the dump truck 1 in the loaded state and the deceleration a2 of the dump truck 1 in the empty state. The deceleration a2 is larger than the deceleration a1.

When it is determined that a load exists in the vessel 3, the deceleration a1 is set. When it is determined that a load does not exist in the vessel 3, the deceleration a2 is set.

The traveling state of the dump truck 1 is detected by the traveling state detection device 10. The traveling speed Vt of the dump truck 1 is detected by the traveling speed detection device 10A. The traveling direction of the dump truck 1 is detected by the traveling direction detection device 10B. The advancing direction of the dump truck 1 is detected by the advancing direction detection device 10C. The detection result of the traveling state detection device 10 is output to the control device 30. The control device 30 acquires the detection result of the traveling state detection device 10.

Next, time information used to determine the possibility of the collision with the object is calculated based on the detection result of the traveling state detection device 10. In the embodiment, a required stop distance Ds is calculated. Further, a stop distance passage time Ts is calculated based on the traveling speed Vt and the required stop distance Ds.

Figure 10:
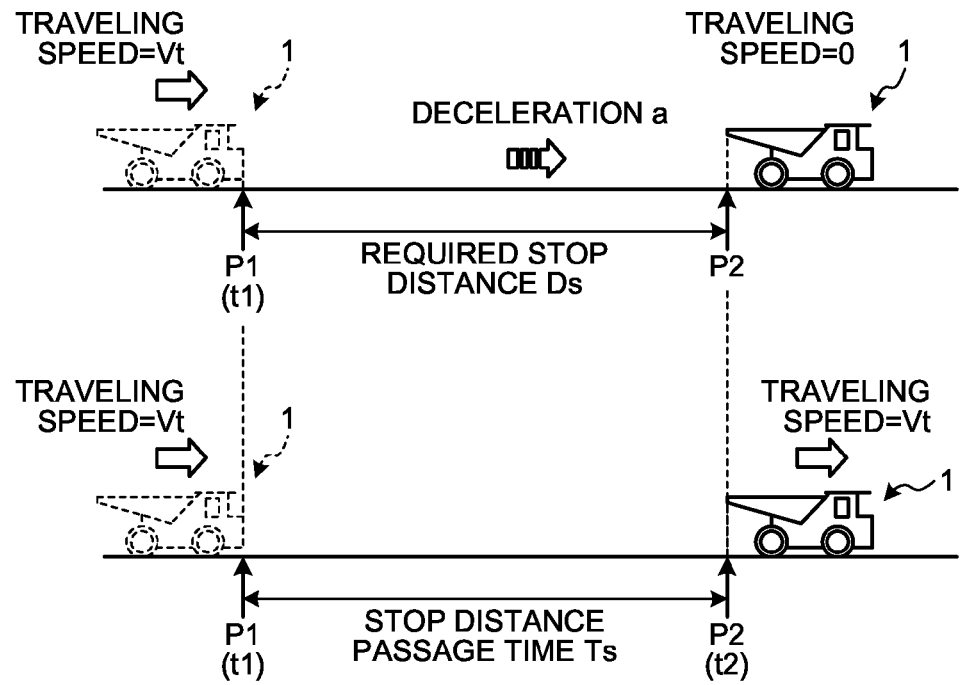
FIG. 10 is a schematic view illustrating a collision possibility determination method.

FIG. 10 is a view illustrating the required stop distance Ds and the stop distance passage time Ts. The required stop distance Ds will be described. As illustrated in FIG. 10, if the retarder 28 is operated so that the current brake state becomes the full brake state when the dump truck 1 is located at a first point P1 in the case where the traveling speed of the dump truck 1 at the first point P1 detected by the traveling state detection device 10 is Vt and the set deceleration is a, the dump truck 1 stops at a second point P2 in front of the first point P1. The required stop distance Ds is a distance between the first point P1 where the retarder 28 is operated in the full brake state and the second point P2 where the dump truck 1 may be stopped. At the second point P2, the traveling speed is, of course, 0. When the traveling speed of the dump truck 1 at the first point P1 detected by the traveling state detection device 10 is Vt and the set deceleration is a, the required stop distance Ds is obtained from the following equation (1).

$$Ds = Vt(Vt/a) - (1/2)a(Vt/a)^2 = (1/2a)Vt^2 \quad (1)$$

Thus, when the deceleration a1 is set, the following equation is obtained.

$$Ds = (1/2a1)Vt^2 \quad (1A)$$

When the deceleration a2 is set, the following equation is obtained.

$$Ds = (1/2a2)Vt^2 \quad (1B)$$

In this way, in the embodiment, the required stop distance Ds between the first point P1 and the second point P2 where the dump truck 1 may be stopped is calculated based on the set deceleration a and the traveling speed Vt of the dump truck 1 (the vehicle 2) at the first point P1 detected by the traveling state detection device 10 is calculated.

Next, the stop distance passage time Ts will be described. The stop distance passage time Ts indicates the time from the first time point t1 at which the dump truck 1 exists at the first point P1 to the second time point t2 at which the dump truck reaches the second point P2 when the dump truck travels by the required stop distance Ds at the traveling speed Vt. That is, the stop distance passage time Ts indicates the time necessary for the dump truck 1 to travel by the required stop distance Ds when the dump truck travels by the required stop distance Ds at the constant traveling speed Vt without the operation of the brake device 13 in the state where the dump truck travels at the traveling speed Vt in the first point P1 (the first time point t1). The stop distance passage time Ts is obtained based on the following equation (2).

$$Ts = Ds/Vt \quad (2)$$

With the above-described configuration, the required stop distance Ds and the stop distance passage time Ts are respectively calculated.

The object detection device 12 detects, for example, the front dump truck 1F. The detection result of the object detection device 12 is output to the control device 30. The control device 30 acquires the detection result of the object detection device 12.

The object detection device 12 includes a radar device, and may detect the front dump truck 1F. The object detection device 12 may detect the relative distance Dr and the relative speed Vr of the front dump truck 1F and the dump truck 1 provided with the object detection device 12. The object detection device 12 detects the relative distance Dr and the relative speed Vr with respect to the front dump truck 1F, and outputs the detection result to the control device 30. The control device 30 acquires the relative distance Dr and the relative speed Vr with respect to the front dump truck 1F.

The time information used to determine the possibility of the collision is calculated based on the detection result of the object detection device 12. An object arrival time Ta taken until the dump truck 1 arrives at the front dump truck 1F is calculated.

Figure 11:
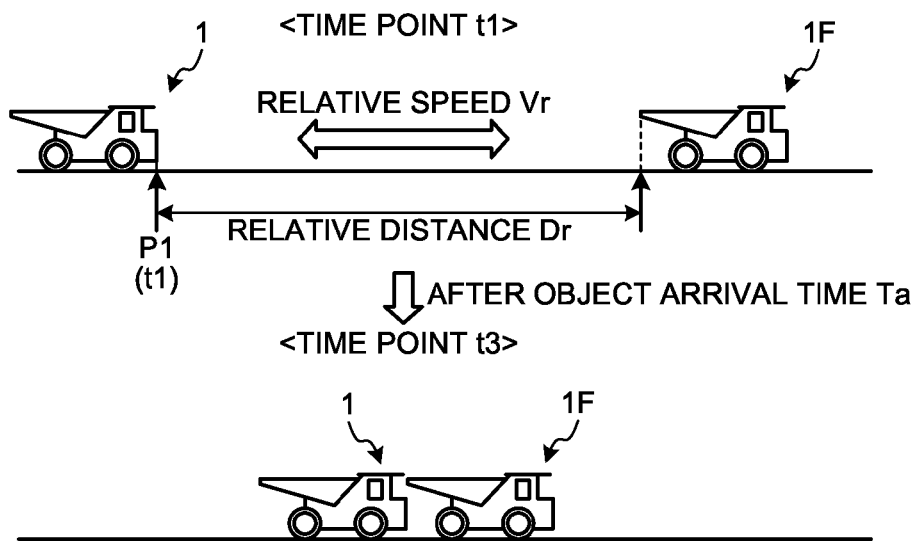
FIG. 11 is a schematic view illustrating the collision possibility determination method.

FIG. 11 is a view illustrating the object arrival time Ta. The object arrival time Ta indicates the time taken to the third time point t3 at which the dump truck 1 arrives at the front dump truck 1F when the dump truck travels by the relative distance Dr at the relative speed Vr from the first time point t1 based on the relative distance Dr and the relative speed Vr of the dump truck 1 and the front dump truck 1F at the first point P1 (the first time point t1) detected by the object detection device 12 of the dump truck 1 when the dump truck 1 exists at the first point P1. That is, when the time point at which the relative distance Dr and the relative speed Vr are detected is set as the first time point t1 and the time point at which the dump truck 1 arrives at the front dump truck 1F when the dump truck travels by the relative distance Dr detected at the first time point t1 at the relative speed Vr is set as the third time point t3, the object arrival time Ta indicates the time from the first time point t1 to the third time point t3. The object arrival time Ta is obtained by the following equation (3).

$$Ta=Dr/Vr \quad (3)$$

In this way, the object arrival time Ta taken until the third time point t3 at which the dump truck 1 arrives at the front dump truck 1F when the dump truck travels by the relative distance Dr at the relative speed Vr from the first time point t1 is calculated based on the relative distance Dr and the relative speed Vr of the dump truck 1 and the front dump truck 1F at the first time point t1 detected by the object detection device 12.

The collision determination unit 31 determines the possibility of the collision between the dump truck 1 and the front dump truck 1F based on the stop distance passage time Ts and the object arrival time Ta.

The collision determination unit 31 compares the stop distance passage time Ts with the object arrival time Ta and determines the possibility of the collision based on the comparison result. In the embodiment, the collision determination unit 31 performs the calculation of "Ta−Ts". Based on the result of the calculation of "Ta−Ts", it is estimated whether the dump truck 1 and the front dump truck 1F collide with each other from the first time point t1. The possibility of the collision is determined based on the estimated time.

When the calculation result satisfies the relation of "Ta−Ts≤0", the time taken for the collision between the dump truck 1 and the front dump truck 1F, that is, the object arrival time Ta is estimated as the time equal to the stop distance passage time Ts or the time shorter than the stop distance passage time Ts. In this case, the collision determination unit 31 determines that the possibility of the collision is Level 1 in which the possibility of the collision between the dump truck 1 and the front dump truck 1F is the highest.

When the calculation result satisfies the relation of "α≥Ta−Ts>0" (step SA13, Yes), the time taken for the collision between the dump truck 1 and the front dump truck 1F, that is, the object arrival time Ta is estimated as the time slightly longer than the stop distance passage time Ts. In this case, the collision determination unit 31 determines that the possibility of the collision is Level 2 in which the possibility of the collision between the dump truck 1 and the front dump truck 1F is lower than that of Level 1. The numerical value a is a positive value which is set in advance.

When the calculation result satisfies the relation of "Ta−Ts>α" (step SA13, No), the time taken for the collision between the dump truck 1 and the front dump truck 1F, that is, the object arrival time Ta is estimated as the time sufficiently longer than the stop distance passage time Ts. In this case, the collision determination unit 31 determines that the possibility of the collision is Level 3 in which the possibility of the collision between the dump truck 1 and the front dump truck 1F is the lowest.

In this way, it is estimated whether the dump truck 1 and the front dump truck 1F collide with each other based on the result of the calculation "Ta−Ts", and the possibility of the collision is determined based on the estimation result. Further, the possibility of the collision (the risk) is classified into a plurality of levels based on the estimation result. In the embodiment, the possibility of the collision is classified into Level 1, Level 2, and Level 3. Among Level 1, Level 2, and Level 3, Level 1 is the level in which the possibility of the collision is the highest, Level 2 is the level in which the possibility of the collision is lower than that of Level 1, and Level 3 is the level in which the possibility of the collision is the lowest.

(Dump Truck Control Method)

Next, an example of a method of controlling the dump truck 1 will be described. In the embodiment, an example of a control method of reducing damage caused by the collision between the dump truck 1 and the front dump truck 1F will be mainly described.

Figure 12:
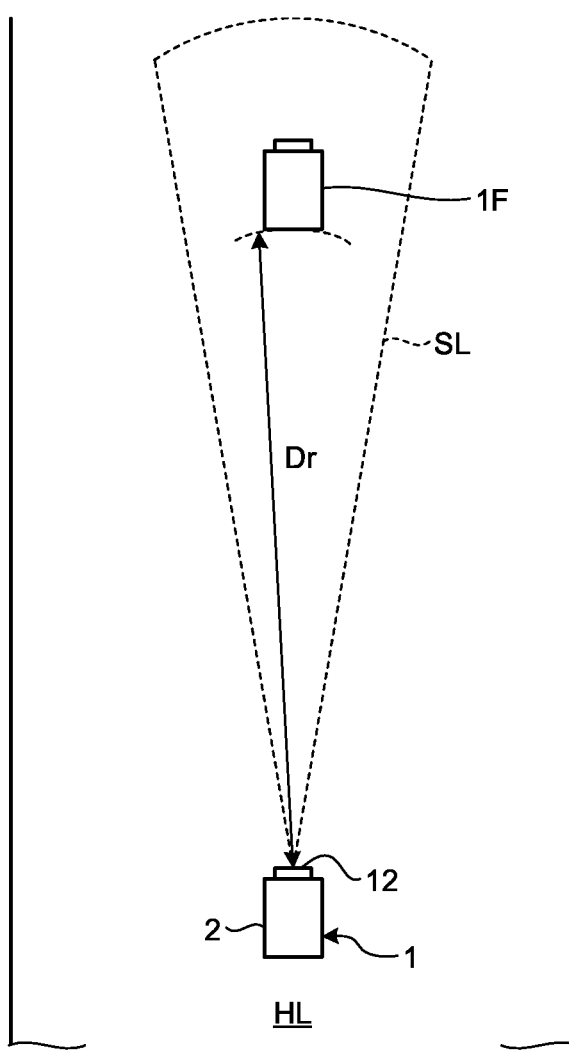
FIG. 12 is a schematic view illustrating an example of the traveling transporter vehicle.

FIG. 12 is a schematic view illustrating an example of the dump truck 1 according to the embodiment. FIG. 12 illustrates an example of the dump truck 1 traveling along the traveling road HL in the linear movement state. The dump truck 1 which starts to move from at least one of a mine loading field LPA where a load is loaded on the vessel 3 and a mine soil disposal field DPA where the load of the vessel 3 is discharged travels along the mine traveling road HL. When the dump truck 1 travels along the traveling road HL, the traveling direction operation unit 15 is operated by the operator WM. The steering device 14 adjusts the traveling direction of the dump truck 1 so that the dump truck 1 travels along the traveling road HL based on the operation signal R3 generated by the operation of the traveling direction operation unit 15.

A process for reducing damage caused by the collision performed by the collision prevention system 300S of the dump truck 1 includes a process for reducing damage caused by the crash into the front dump truck 1F on the traveling road HL. As illustrated in FIG. 12, when the front dump truck 1F is detected by the object detection device 12 in the linear movement state of the dump truck 1 and it is determined that there is a high possibility of the collision, the collision prevention system 300S performs a process for reducing damage caused by the crash into the front dump truck 1F.

When it is determined that there is a high possibility of the collision with the front dump truck 1F (Level 1) in the linear movement state of the dump truck 1, the control device 30 outputs the control signal C from the control unit 35 in order to reduce damage caused by the collision (crash) with the front dump truck 1F.

The control unit 35 outputs the control signal C4 to the brake device 13 in order to operate the retarder 28. The control unit 35 outputs the control signal C4 to the retarder 28 so that the retarder 28 is operated in the full brake state. The brake process of the retarder 28 is performed based on the control signal C4 supplied from the control unit 35. Accordingly, the traveling speed of the dump truck 1 is decreased or the dump truck 1 is stopped. Thus, a damaged caused by the collision between the dump truck 1 and the front dump truck 1F is reduced.

Furthermore, when it is determined that the possibility of the collision is Level 1, the control unit 35 may output the control signal C1 to the power generation device 22 so that the output of the power generation device 22 is reduced. The output reduction process of the power generation device 22 is performed based on the control signal C1 supplied from the control unit 35. Accordingly, the traveling speed of the dump truck 1 is decreased. Thus, a damaged caused by the collision between the dump truck 1 and the front dump truck 1F is reduced.

Furthermore, when it is determined that the possibility of the collision is Level 1, the control unit 35 may output the control signal C4 to the retarder 28 and may output the control signal C1 to the power generation device 22. That is, the output reduction process of the power generation device 22 may be performed along with the brake process of the retarder 28.

When it is determined that the possibility of collision is slightly high (Level 2), the control unit 35 may output the control signal C6 to the alarm device 21 so that the alarm device 21 generates an alarm. The alarm generation process of the alarm device 21 is performed based on the control signal C4 supplied from the control unit 35. The alarm device 21 refreshes the attention of the operator WM by generating a sound or light. Accordingly, an operation of reducing damage caused by the collision is performed by the operator WM. Thus, a damaged caused by the collision between the dump truck 1 and the front dump truck 1F is reduced.

Furthermore, when it is determined that the possibility of the collision is Level 2, the control unit 35 may output the control signal C5 to the display device 20. The display process of the display device 20 is performed based on the control signal C5 supplied from the control unit 35. Accordingly, an operation for reducing damage caused by the collision is performed by the operator WM.

Furthermore, when it is determined that the possibility of the collision is Level 2, the control unit 35 may output the control signal C4 so that the retarder 28 is operated. For example, the brake process of the retarder 28 may be performed so that a braking force smaller than the braking force in the full brake state is generated based on the control signal C4 supplied from the control unit 35.

Furthermore, when it is determined that the possibility of the collision is Level 2, the control unit 35 may output the control signal C1 so that the output of the power generation device 22 is reduced. The output reduction process of the power generation device 22 is performed based on the control signal C1 supplied from the control unit 35.

When it is determined that the possibility of collision is low (Level 3), a process of the process system 600 for reducing damage caused by the collision is not performed.

Furthermore, when the dump truck 1 moves backward, the possibility of the collision between the dump truck 1 and the front dump truck 1F is low. For that reason, when it is determined that the dump truck 1 moves backward based on the detection result of the advancing direction detection device 10C, a process of the process system 600 for reducing damage caused by the collision may not be performed.

Figure 13:
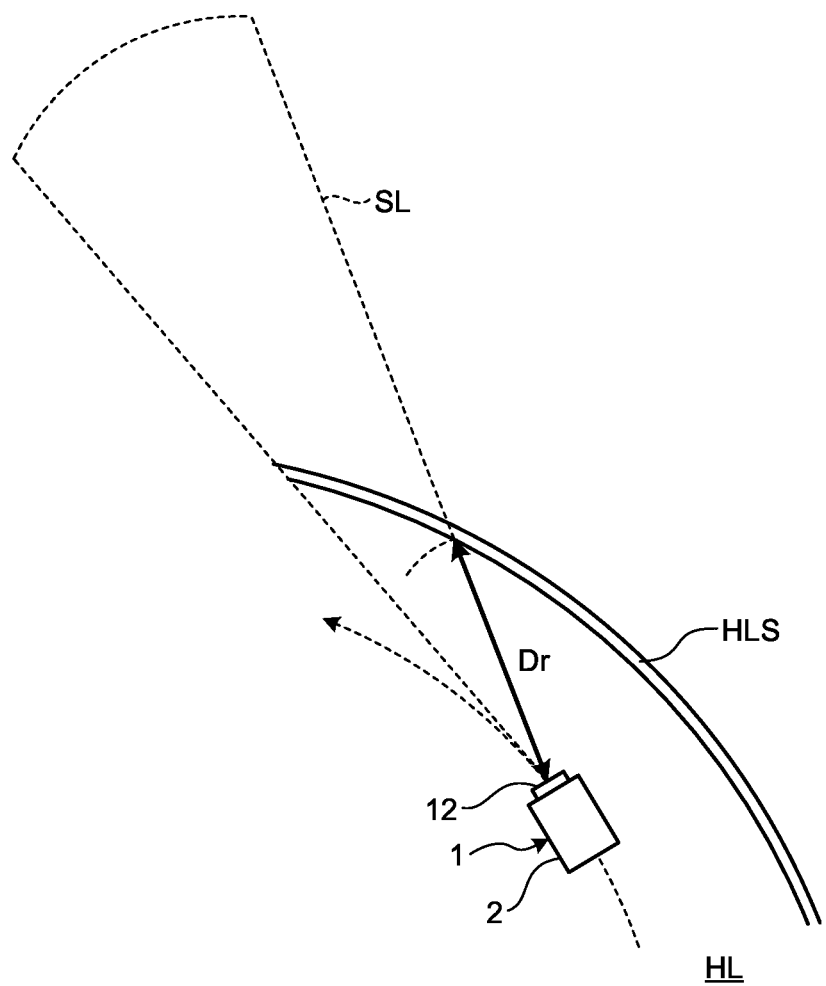
FIG. 13 is a schematic view illustrating an example of the traveling transporter vehicle.

FIG. 13 is a schematic view illustrating an example of a state where the dump truck 1 (the traveling device 4) travels along the curve of the traveling road HL.

As illustrated in FIG. 13, in many cases, a bank HLS is provided in the outside area (the road shoulder) of the traveling road HL in the mine. In the description below, the bank HLS which is provided in the road shoulder of the traveling road HL is appropriately referred to as a road shoulder wall HLS.

The height of the road shoulder wall HLS is higher than the height of the convex portion of the unevenness of the road surface. When the detection area SL includes the road shoulder wall HLS, the object detection device 12 recognizes the road shoulder wall HLS as an obstacle (an object). The object detection device 12 detects the existence of the front object, but it is difficult to specifically determine the type of the object.

As illustrated in FIG. 13, in the case where the road shoulder wall HLS is provided in the curve of the traveling road HL, there is a possibility that the road shoulder wall HLS may be included in the detection area SL of the object detection device 12 of the dump truck 1 traveling along the curve even when the dump truck 1 travels along the curve of the traveling road HL without the collision with the road shoulder wall HLS. When the dump truck 1 travels along the curve, the relative distance Dr between the dump truck 1 and the road shoulder wall HLS is sometimes short. In such a case, although there is a low possibility of the collision between the dump truck 1 and the road shoulder wall HLS, the collision determination unit 31 may erroneously determine that there is a high possibility of the collision between the dump truck 1 and the road shoulder wall HLS (Level 1 or Level 2) based on the detection result of the object detection device 12. When the collision determination unit 31 performs the erroneous determination, a process for reducing damage caused by the collision is performed by the collision prevention system 300S although there is no need to perform a process for reducing damage caused by the collision using the collision prevention system 300S. For example, although there is no need to operate the retarder 28 and/or the brake device 13, the control signal C4 and/or the control signal C1 for performing a brake process is output from the control unit 35 to the retarder 28 and/or the brake device 13. By the brake process, the traveling operation of the dump truck 1 is excessively limited, and hence there is a possibility that the work efficiency of the dump truck 1 may be degraded. Further, although the alarm device 21 does not need to perform an alarm generation process, the control signal C6 for performing the alarm generation process is output from the control unit 35 to the alarm device 21. By the alarm generation process, there is a possibility that the operation of the operator WM may be disturbed. The operator WM may feel troublesome due to the excessive brake process or the alarm generation process.

In the embodiment, even when the road shoulder wall HLS is disposed in the detection area SL of the object detection device 12 and the collision determination unit 31 determines that there is a high possibility of the collision based on the detection result of the object detection device 12 when the dump truck 1 travels along the curve of the traveling road HL provided with the road shoulder wall HLS, at least a part of the process of the collision prevention system 300S is invalidated by the invalidation unit 32 so that the traveling operation of the dump truck 1 is not excessively limited or the operation of the operator WM is not disturbed.

The invalidation unit 32 invalidates at least a part of the process of the collision prevention system 300S based on the determination value SV set by the determination value setting unit 33 and the detection value DV of the change amount in the traveling direction of the dump truck 1 (the traveling device 4) from the linear movement state. That is, at least a part of the process of the collision prevention system 300S is invalidated when the dump truck 1 travels (swings) along the curve having a large curvature in the traveling road HL based on the curve state (the swing state) of the curve of the dump truck 1. In other words, when there is a large difference (in angle) between the traveling direction of the dump truck 1 in the linear movement state and the traveling direction of the dump truck 1 in the non-linear movement state, at least a part of the function of the collision prevention system 300S is not exhibited so that the excessive limit of traveling operation by the erroneous determination of the collision determination unit 31 is not performed.

The determination value SV may be determined based on the curvature of the curve of the traveling road HL. When the traveling road HL of the mine includes a plurality of curves, the determination value SV may be determined based on the curve having the smallest curvature (the curve having the loosest curve state) among the plurality of curves. When the dump truck 1 may smoothly travel along the curve in the non-linear movement state in which the traveling direction is changed by a predetermined amount (a predetermined angle) from the linear movement state, the predetermined amount (the change amount) may be determined as the determination value SV. Furthermore, the determination value SV may be determined based on the radius of the curve instead of the curvature of the curve of the traveling road HL. That is, the determination value SV may be determined based on the degree of the curve.

A change amount (the curved state of the curve) in the traveling direction of the dump truck 1 from the linear movement state is detected by the traveling direction detection device 10B including the steering sensor. The invalidation unit 32 compares the determination value SV and the detection value DV of the traveling direction detection device 10B, and invalidates at least a part of the output from the collision prevention system 300S so that the function of the collision prevention system 300S is not exhibited when the detection value DV is larger than the determination value SV. The detection value DV includes the value of the relative angle (the steering angle) with respect to the reference angle.

Since the determination value SV is determined based on the curvature (for example, the curvature of the curve having the loosest curve state among a plurality of curves) of the traveling road HL (the curve) of the mine, at least a part of the function of the collision prevention system 300S is invalidated even when the road shoulder wall HLS of the curve is included in the detection area SL of the object detection device 12 or the collision determination unit 31 performs an erroneous determination in the traveling dump truck 1 on the traveling road HL having a curve, and hence degradation in the work efficiency of the dump truck 1 is suppressed. Alternatively, it is possible to suppress a problem in which the operator WM feels troublesome due to the excessive brake process or the alarm generation process.

Figure 14:
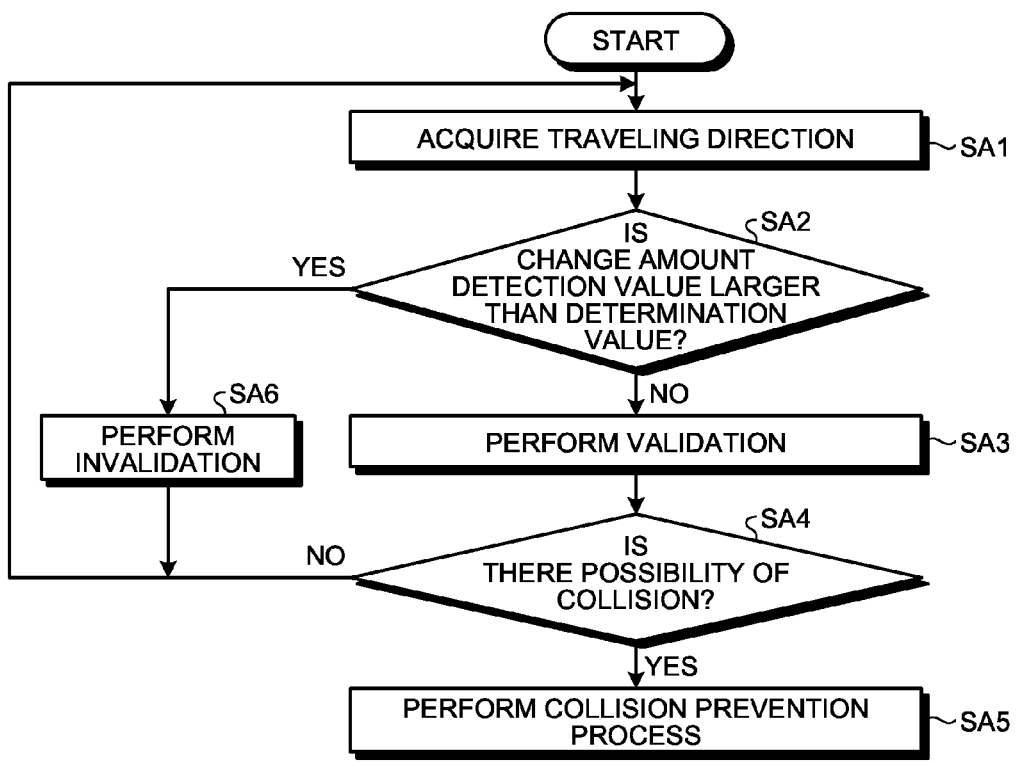
FIG. 14 is a flowchart illustrating an example of a transporter vehicle control method.

Next, a method of controlling the dump truck 1 according to the embodiment will be described with reference to the flowchart of FIG. 14. The dump truck 1 which starts to move from at least one of the loading field LPA and the soil disposal field DPA travels along the traveling road HL of the mine. When the dump truck 1 of the traveling road HL travels along the traveling road HL, the traveling direction operation unit 15 is operated by the operator WM. The steering device 14 adjusts the traveling direction of the dump truck 1 so that the dump truck 1 travels along the traveling road HL based on the operation signal R3 generated by the traveling direction operation unit 15.

The traveling direction detection device 10B detects the traveling direction of the dump truck 1. The traveling direction of the dump truck 1 includes the change amount in the traveling direction of the dump truck 1 from the linear movement state. The detection result of the traveling direction detection device 10B is output to the control device 30. The control device 30 acquires the detection result of the traveling direction detection device 10B (step SA1).

The determination value SV related to the change amount in the traveling direction of the dump truck 1 from the linear movement state is set by the determination value setting unit 33. The invalidation unit 32 determines whether to invalidate at least a part of a process of reducing damage caused by the collision using the collision prevention system 300S based on the determination value SV and the detection value DV of the change amount in the traveling direction of the dump truck 1 detected by the traveling direction detection device 10B. In the embodiment, it is determined whether the detection value DV of the change amount in the traveling direction is larger than the determination value SV (step SA2).

In step SA2, when it is determined that the detection value DV is equal to or smaller than the determination value SV (step SA2, No), the invalidation unit 32 validates the function of the collision prevention system 300S without invalidating the function of the collision prevention system 300S (step SA3).

The collision determination unit 31 determines the possibility of the collision based on the detection result of the loading state detection device 11, the detection result of the traveling state detection device 10, and the detection result of the object detection device 12 (step SA4).

In step SA4, when it is determined that there is a high possibility of the collision (step SA4, Yes), a process for reducing damage caused by the collision is performed (step SA5). For example, when it is determined that the possibility of the collision is Level 1, at least one of the control signal C1, the control signal C2, and the control signal C4 is output from the control unit 35. Accordingly, at least one of the brake process of the brake device 13, the brake process of the retarder 28, and the output reduction process of the power generation device 22 is performed. When it is determined that the possibility of the collision is Level 2, at least one of the control signal C5 and the control signal C6 is output from the control unit 35. Accordingly, at least one of the alarm generation process of the alarm device 21 and the display process of the display device 20 is performed. Furthermore, when it is determined that the possibility of the collision is Level 2, both the control signal C5 and the control signal C6 may be output from the control unit 35 so that both the alarm generation process of the alarm device 21 and the display process of the display device 20 are performed.

In step SA4, when it is determined that there is a low (no) possibility of the collision (step SA4, No), the routine returns to step SA1 so that the above-described process is performed.

In step SA2, when it is determined that the detection value DV of the change amount is larger than the determination value SV (step SA2, Yes), the invalidation unit 32 invalidates at least a part of the output from the collision prevention system 300S (step SA6).

The invalidation unit 32 invalidates at least one of the detection signal S2 output from the object detection device 12, the control signal C output from the control unit 35, and the power P output from the power supply device 60.

Since the detection signal S2 is invalidated, the detection signal S2 of the object detection device 12 is not output to the collision determination unit 31. The collision determination unit 31 does not determine the possibility of the collision between the dump truck 1 and the object. For that reason, the control signal C is not output from the control unit 35 based on the determination result of the collision determination unit 31. Accordingly, the traveling operation of the dump truck 1 is not excessively limited or the alarm is not generated.

Since the control signal C output from the control unit 35 is invalidated, the traveling operation of the dump truck 1 is not excessively limited or the alarm is not generated. For example, since the control signal C4 output from the control unit 35 to the retarder 28 is invalidated, the unnecessary brake process is not performed. Since the control signal C1 output from the control unit 35 to the power generation device 22 is invalidated, the unnecessary output reduction process is not performed. Since the control signal C6 output from the control unit 35 to the alarm device 21 is invalidated, the unnecessary alarm generation process is not performed.

Since the power P output from the power supply device 60 to the object detection device 12 is invalidated, the detection signal S2 is not output from the object detection device 12. The invalidation of the power P includes the stop of the supply of the power P. Since the power P output from the power supply device 60 to the control unit 35 is invalidated, the control signal C is not output from the control unit 35.

(Action)

As described above, according to the embodiment, since at least a part of the process (the function) of the collision prevention system 300S is invalidated based on the determination value SV and the detection value DV of the change amount in the traveling direction of the dump truck 1 from the linear movement state, at least a part of the process of the collision prevention system 300S is invalidated when the object detection device 12 of the traveling dump truck 1 detects the object in the non-linear movement state (the swing state) of the curve, and hence it is possible to prevent a problem in which the traveling operation of the dump truck 1 is excessively limited or the alarm is generated although the possibility of the collision between the object and the dump truck 1 is low. Since the process of the collision prevention system 300S is validated when the object detection device 12 of the traveling dump truck 1 detects the object in the linear movement state, it is possible to suppress damage caused by the collision between the object and the dump truck 1 by limiting the traveling operation of the dump truck 1 or generating the alarm for the operator WM. Accordingly, it is possible to suppress degradation in the work efficiency of the dump truck 1 while reducing damage caused by the collision with the front dump truck 1F.

In the embodiment, even when it is determined that the possibility of the collision is high by the collision determination unit 31 based on the detection result of the object detection device 12, at least a part of the function of the collision prevention system 300S is invalidated by the invalidation unit 32 when the detection value DV is larger than the determination value SV. Accordingly, the unnecessary process of the collision prevention system 300S based on the erroneous determination of the collision determination unit 31 is suppressed.

In the embodiment, the dump truck 1 starts to move from at least one of the mine loading field LPA where a load is loaded on the vessel 3 and the mine soil disposal field DPA where the load of the vessel 3 is discharged, and travels along the traveling road HL of the mine. A process for reducing damage caused by the collision using the collision prevention system 300S includes a process for reducing damage caused by the crash into the front dump truck 1F traveling at the front side of the dump truck 1 on the traveling road HL. The dump truck 1 travels along the curve of the traveling road HL provided with the road shoulder wall HLS. Since the determination value SV is determined based on the curvature of the curve of the traveling road HL, the dump truck 1 may smoothly travel along the traveling road HL in the mining site of the mine without excessively limiting the traveling operation or generating the excessive alarm for the operator WM.

<Second Embodiment>

A second embodiment will be described. In the description below, the same reference numerals will be given to the same or identical components to the above-described embodiment, and the description thereof will be simplified or omitted.

Figure 15:
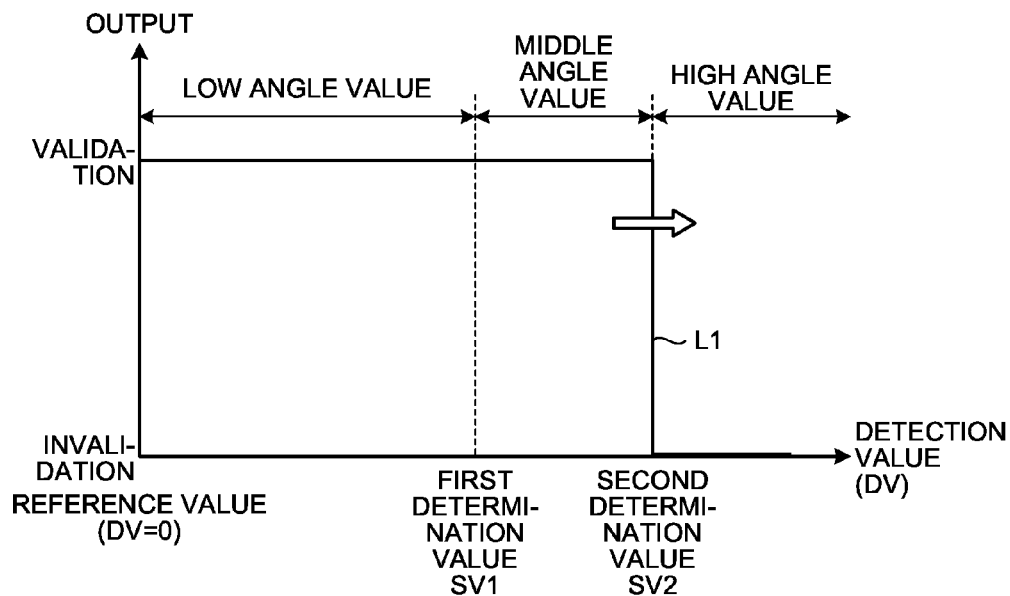
FIG. 15 is a schematic view illustrating an example of a relation between a detection value and invalidation.
Figure 16:
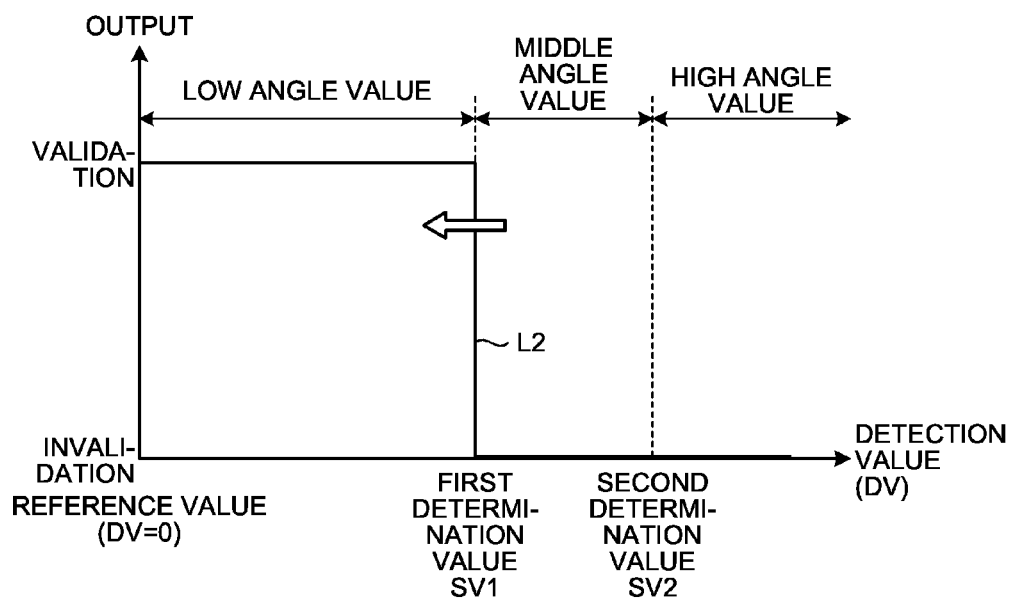
FIG. 16 is a schematic view illustrating an example of a relation between the detection value and the invalidation.

FIGS. 15 and 16 are schematic views illustrating an example of a relation between the invalidation of the invalidation unit 32 and the detection value (the steering angle) DV of the change amount in the traveling direction obtained by the traveling direction detection device 10B.

In the embodiment, the determination value SV includes a first determination value SV1 and a second determination value SV2 larger than the first determination value SV1. The first determination value SV1 and the second determination value SV2 are set by the determination value setting unit 33. When the detection value (the steering angle) DV is the reference value (the reference angle), the traveling device 4 travels in the linear movement state. The detection value DV is a 0 value when the steering angle is the reference angle. When the detection value DV is larger than the reference value, the traveling device 4 travels in the non-linear movement state. The first determination value SV1 and the second determination value SV2 are larger than the reference value. When the detection value DV is the second determination value SV2, the traveling device 4 swings with a curvature larger than the case where the detection value DV is the first determination value SV1.

The traveling direction of the dump truck 1 is adjusted by the operation of the steering device 14 using the traveling direction operation unit 15. The detection value DV of the traveling direction is changed by the operation of the traveling direction operation unit 15. The traveling direction operation unit 15 may operate the steering device 14 so that the traveling device 4 changes from the linear movement state to the non-linear movement state. The traveling direction operation unit 15 may operate the steering device 14 so that the traveling device 4 changes from the non-linear movement state to the linear movement state. When the operator WM turns the handle by turning the traveling direction operation unit (the handle operation unit) 15, the traveling device 4 changes from the linear movement state to the non-linear movement state. When the operator WM returns the handle by turning the traveling direction operation unit 15, the traveling device 4 changes from the non-linear movement state to the linear movement state.

In the description below, as for the detection value DV, a value which is larger than the reference value and is equal to or smaller than the first determination value SV1 will be appropriately referred to as the low angle value, a value which is larger than the first determination value SV1 and is equal to or smaller than the second determination value SV2 will be appropriately referred to as the middle angle value, and a value which is larger than the second determination value SV2 will be appropriately referred to as the high angle value.

When the detection value DV is the low angle value, the collision prevention system 300S is validated (is not invalidated). When the detection value DV is the high angle value, the collision prevention system 300S is invalidated. In the description below, a state where the output from the collision prevention system 300S is validated (is not invalidated) will be appropriately referred to as the valid state, and a state where the output from the collision prevention system 300S is invalidated will be appropriately referred to as the invalid state.

As illustrated in FIG. 15, when the detection value DV changes to the middle angle value in the valid state where the detection value DV is the low angle value, the valid state is maintained. When the detection value DV changes to the high angle value in the valid state where the detection value DV is the middle angle value, the valid state changes to the invalid state as indicated by the arrow of FIG. 15. That is, the output from the collision prevention system 300S changes as indicated by the line L1 of FIG. 15.

As illustrated in FIG. 16, when the detection value DV changes to the middle angle value in the invalid state where the detection value DV is the high angle value, the invalid state is maintained. When the detection value DV changes to the low angle value in the invalid state where the detection value DV is the middle angle value, the invalid state changes to the valid state as indicated by the arrow of FIG. 16. That is, the output from the collision prevention system 300S changes as indicated by the line L2 of FIG. 16.

When the traveling device 4 is changed from the linear movement state to the non-linear movement state, the traveling direction operation unit 15 is operated so that the detection value DV changes from the low angle value to the high angle value through the middle angle value as indicated by the line L1 of FIG. 15. In this case, the valid state is selected at the low angle value and the middle angle value, and the invalid state is selected at the high angle value.

When the traveling device 4 is changed from the linear movement state to the non-linear movement state, there is a possibility that the detection value DV may frequently change (fluctuate) from one value of the middle angle value and the high angle value to the other value thereof. For example, there is a possibility that the detection value DV may change from one value of the middle angle value and the high angle value to the other value thereof due to the operation state of the traveling direction operation unit 15 operated by the operator WM.

As illustrated in FIGS. 15 and 16, in the embodiment, a state where the collision prevention system 300S is invalidated is maintained until the detection value DV becomes larger than the second determination value SV2 and becomes equal to or smaller than the first determination value SV1. That is, the invalid state is maintained until the detection value DV becomes the low angle value after the detection value DV becomes the high angle value so that the invalid state is selected. Accordingly, the invalid state is maintained even when the detection value DV becomes the middle angle value after the detection value DV becomes the high angle value so that the invalid state is selected. Thus, even in a state where the detection value DV frequently changes from one value of the middle angle value and the high angle value to the other value thereof, it is possible to suppress a problem in which the state of the collision prevention system 300S is frequently switched between the invalid state and the valid state. For example, it is possible to suppress a problem in which the brake process of the retarder 28 is frequently performed and not performed based on the control signal C4 from the control unit 35 or the alarm generation process of the alarm device 21 is frequently performed and not performed based on the control signal C6 from the control unit 35 during the operation of the traveling direction operation unit 15.

When the traveling device 4 is changed from the non-linear movement state to the linear movement state, there is a possibility that the detection value DV may frequently change (fluctuate) from one value of the low angle value and the middle angle value to the other value thereof. For example, there is a possibility that the detection value DV may change from one value of the low angle value and the middle angle value to the other value thereof due to the operation state of the traveling direction operation unit 15 operated by the operator WM.

As illustrated in FIGS. 15 and 16, in the embodiment, a state where the collision prevention system 300S is not invalidated (is validated) is maintained until the detection value DV becomes equal to or smaller than the first determination value SV1 and becomes larger than the second determination value SV2. That is, the valid state is maintained until the detection value DV becomes the high angle value after the detection value DV becomes the low angle value so that the valid state is selected. Accordingly, the valid state is maintained even when the detection value DV becomes the middle angle value after the detection value DV becomes the low angle value so that the valid state is selected. Thus, even in a state where the detection value DV frequently changes from one value of the low angle value and the middle angle value to the other value thereof, it is possible to suppress a problem in which the state of the collision prevention system 300S is frequently switched between the invalid state and the valid state. For example, it is possible to suppress a problem in which the brake process of the retarder 28 is frequently performed and not performed based on the control signal C4 from the control unit 35 or the alarm generation process of the alarm device 21 is frequently performed and not performed based on the control signal C6 from the control unit 35 during the operation of the traveling direction operation unit 15.

As described above, according to the embodiment, a state where the output from the collision prevention system 300S is invalid is maintained until the detection value DV becomes larger than the second determination value SV2 and becomes equal to or smaller than the first determination value SV1 and a state where the output from the collision prevention system 300S is not invalid is maintained until the detection value DV becomes equal to or smaller than the first determination value SV1 and becomes larger than the second determination value SV2 after the first determination value SV1 and the second determination value SV2 are set. Accordingly, even when the detection value DV is frequently switched between the middle angle value and the high angle value or between the middle angle value and the low angle value when the traveling device 4 is changed from the linear movement state to the non-linear movement state or is changed from the non-linear movement state to the linear movement state by the fine operation of the traveling direction operation unit (the handle operation unit) 15 from the operator WM, it is possible to suppress the state of the collision prevention system 300S from being frequently switched between the invalid state and the valid state. Accordingly, since the dump truck 1 smoothly travels, it is possible to suppress the operator WM from feeling troublesome.

<Third Embodiment>

A third embodiment will be described. In the description below, the same reference numerals will be given to the same or identical components to the above-described embodiment, and the description thereof will be simplified or omitted.

Figure 17:
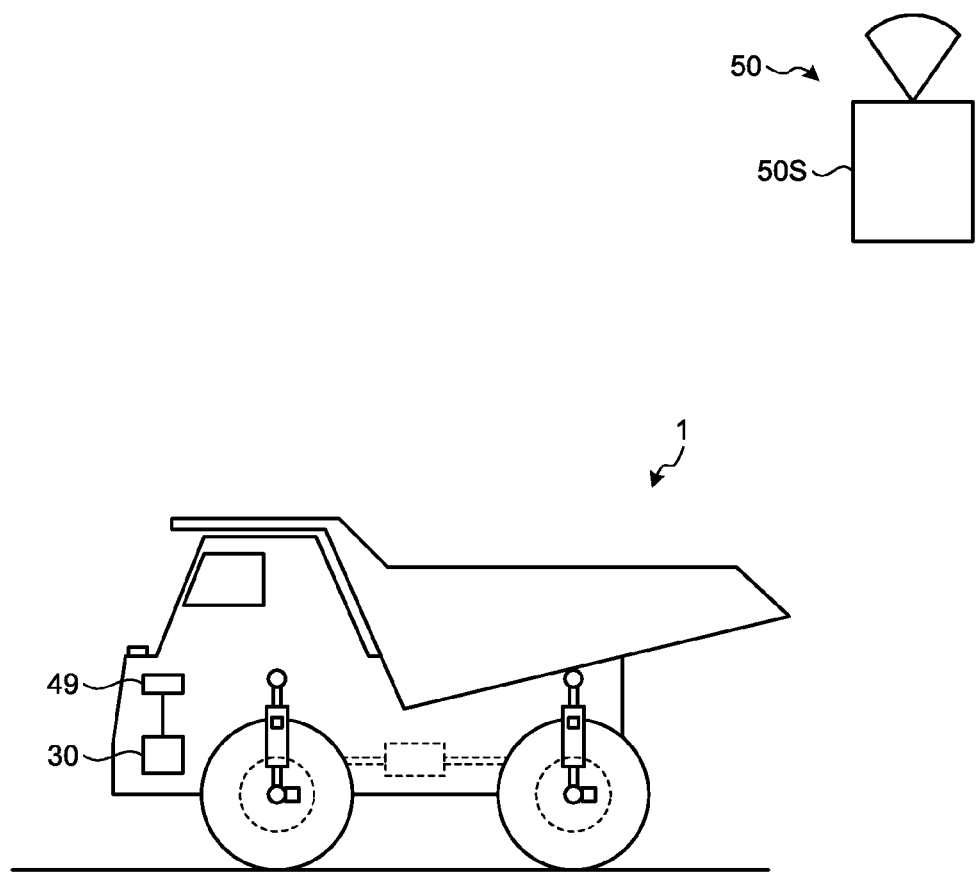
FIG. 17 is a schematic view illustrating an example of the transporter vehicle.

FIG. 17 is a view illustrating an example of the dump truck 1 according to the embodiment. As illustrated in FIG. 17, the position of the dump truck 1 is detected by a global positioning system (GPS) 50. The global positioning system 50 includes a GPS satellite 50S, and detects the position in the coordinate system (the GPS coordinate system) for defining the latitude, the longitude, and the altitude. By the global positioning system 50, the position of the dump truck 1 in the mine is detected. The dump truck 1 includes a GPS receiver 49. The control device 30 acquires the position of the dump truck 1 based on the detection result of the GPS receiver 49.

The control device 30 may obtain the traveling direction of the dump truck 1 based on the detection result of the GPS receiver 49. The control device 30 may obtain a state where the dump truck 1 travels in the linear movement state or the non-linear movement state based on the detection result of the GPS receiver 49. The control device 30 may obtain the change amount in the traveling direction of the dump truck 1 from the linear movement state based on the detection result of a GPS receiver 40.

As described above, it is possible to detect the traveling direction of the dump truck 1 by the global positioning system 50.

Furthermore, the traveling direction detection device that detects the traveling direction (the change amount in the traveling direction from the linear movement state) of the dump truck 1 may include a gyro sensor provided in the dump truck 1. The gyro sensor may detect the orientation of the dump truck 1. The traveling direction detection device may obtain the relative position of the dump truck 1 with respect to the reference position of the mine based on the detection result of the gyro sensor and the detection result of the speed sensor by including the gyro sensor detecting the orientation of the dump truck 1 and the speed sensor detecting the traveling speed of the dump truck 1.

<Fourth Embodiment>

A fourth embodiment will be described. In the description below, the same reference numerals will be given to the same or identical components to the above-described embodiment, and the description thereof will be simplified or omitted.

Figure 18:
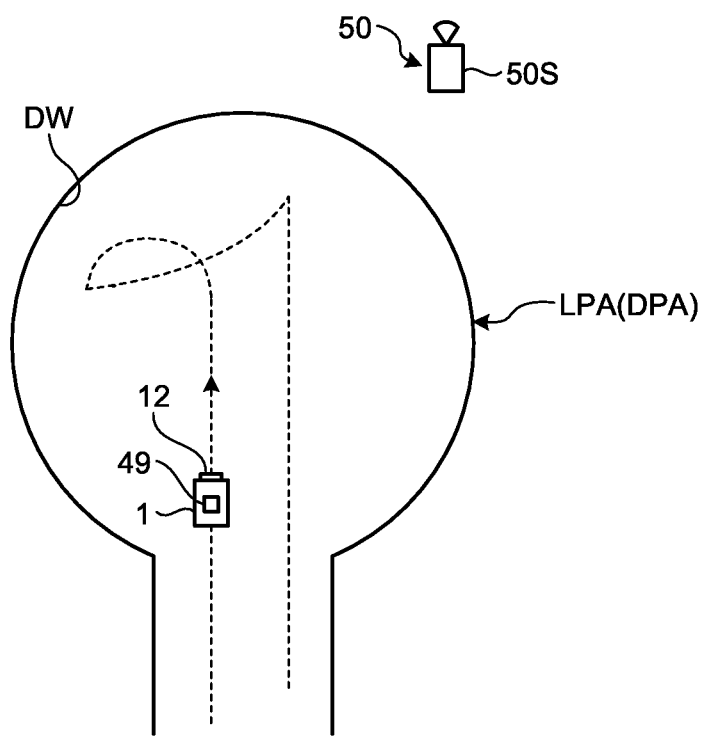
FIG. 18 is a view illustrating an example of the transporter vehicle disposed in a loading field and a soil disposal field.

FIG. 18 is a view illustrating an example of the dump truck 1 according to the embodiment. Similarly to the above-described embodiment, when the dump truck 1 exists on the traveling road HL, the collision prevention system 300S is not invalidated when the detection value DV is equal to or smaller than the determination value SV, and the collision prevention system 300S is invalidated when the detection value DV is larger than the determination value SV.

As illustrated in FIG. 18, when it is determined that the dump truck 1 exists in at least one of the loading field LPA and the soil disposal field DPA, the collision prevention system 300S is invalidated in both cases where the detection value DV is equal to or smaller than the determination value SV and is larger than the determination value SV.

In many cases, the bank (the wall) DW is provided in the loading field LPA and the soil disposal field DPA. The object detection device 12 of the dump truck 1 recognizes the bank DW as the object (the obstacle). There is a case in which the dump truck 1 may swing with a large curvature by, for example, a switchback operation or travel along the bank DW in the non-linear movement state in the loading field LPA and the soil disposal field DPA. When the collision prevention system 300S is validated in the loading field LPA and the soil disposal field DPA, since the object detection device 12 detects the bank DW, there is a possibility that the control signal C4 for performing the brake process may be frequently output from the control unit 35 to the retarder 28 of the dump truck 1 or the control signal C6 for performing the alarm generation process may be frequently output from the control unit 35 to the alarm device 21 of the dump truck 1. When the brake process or the alarm generation process is frequently performed in the loading field LPA and the soil disposal field DPA, there is a possibility that the operation of the dump truck 1 may be disturbed.

In the embodiment, when the dump truck 1 exists in at least one of the loading field LPA and the soil disposal field DPA, the collision prevention system 300S is invalidated in both cases where the detection value DV is equal to or smaller than the determination value SV and is larger than the determination value SV. Accordingly, the operation in the loading field LPA and the soil disposal field DPA is smoothly performed.

The position information of the loading field LPA is given information. The control device 30 may determine whether the dump truck 1 exists in the loading field LPA based on the position information of the loading field LPA as given information and the detection result of the GPS receiver 49. When it is determined that the dump truck 1 exists in the loading field LPA, the control device 30 invalidates the output from the collision prevention system 300S regardless of whether the detection value DV of the change amount in the traveling direction of the dump truck 1 is large or small.

The position information of the soil disposal field DPA is also given information. The control device 30 may determine whether the dump truck 1 exists in the soil disposal field DPA based on the position information of the soil disposal field DPA as given information and the detection result of the GPS receiver 49. When it is determined that the dump truck 1 exists in the soil disposal field DPA, the control device 30 invalidates the output from the collision prevention system 300S regardless of whether the detection value DV of the change amount in the traveling direction of the dump truck 1 is large or small.

Furthermore, in order to determine whether the dump truck 1 exists in any one of the loading field LPA and the soil disposal field DPA, a wireless communication system below may be used instead of using the global positioning system 50. For example, a transmission device that transmits a wireless signal (a wireless signal indicating a specific position) notifying whether the current position is the loading field LPA or the soil disposal field PDA is provided in the entrances of the loading field LPA and the soil disposal field DPA. The dump truck 1 is equipped with a receiving device capable of receiving the wireless signal. In this way, when the receiving device receives a wireless signal indicating a specific position from the transmission device installed in the loading field LPA or the soil disposal field DPA when the dump truck 1 enters the field, the output from the collision prevention system 300S is invalidated regardless of whether the detection value DV of the change amount in the traveling direction of the dump truck 1 is large or small. When such a wireless communication system is used, it is possible to smoothly perform the operation in the loading field LPA and the soil disposal field DPA by the dump truck 1 equipped with the collision prevention system 300S even in a region or a place where the global positioning system 50 may not be used.

As described above, according to the embodiment, since the function of the collision prevention system 300S is invalidated in at least one of the loading field LPA and the soil disposal field DPA, the operation in the loading field LPA and the soil disposal field DPA is smoothly performed.

Furthermore, in the first to fourth embodiments, the vehicle body 5 of the dump truck 1 is divided into the front part and the rear part, and an articulate dump truck of which the front part and the rear part are coupled to each other by free joints may be used.

Furthermore, in the above-described embodiments, the dump truck 1 travels by itself while recognizing the ground form around the own vehicle. However, a configuration may be employed in which the dump truck stores the position information on the traveling road HL and travels by itself according to the position information while checking the position of the own vehicle by the GPS receiver or the like.

Furthermore, in the above-described embodiments, the dump truck 1 may be used not only in the mining site of the mine, but also, for example, the construction site of the dam.

REFERENCE SIGNS LIST

1 DUMP TRUCK
2 VEHICLE
3 VESSEL
4 TRAVELING DEVICE
9 SUSPENSION CYLINDER
10 TRAVELING STATE DETECTION DEVICE
10B TRAVELING DIRECTION DETECTION DEVICE
11 LOADING STATE DETECTION DEVICE
12 OBJECT DETECTION DEVICE
13 BRAKE DEVICE
14 STEERING DEVICE
20 DISPLAY DEVICE
21 ALARM DEVICE
28 RETARDER
30 CONTROL DEVICE
31 COLLISION DETERMINATION UNIT
32 INVALIDATION UNIT
33 DETERMINATION VALUE SETTING UNIT
34 STORAGE UNIT
35 CONTROL UNIT
300 CONTROL SYSTEM
300S COLLISION PREVENTION SYSTEM
400 STATE QUANTITY DETECTION SYSTEM
500 TRAVELING CONDITION ADJUSTMENT SYSTEM
600 PROCESS SYSTEM
DPA SOIL DISPOSAL FIELD
HL TRAVELING ROAD
HLS ROAD SHOULDER WALL
LPA LOADING FIELD

The invention claimed is:

1. A transporter vehicle comprising:
a traveling device capable of changing a traveling direction so that one state of a linear movement state and a non-linear movement state changes to the other state of the linear movement state and the non-linear movement state;
a determination value setting unit that sets a determination value related to a change amount in the traveling direction from the linear movement state;
a collision prevention system that includes an object detection device which detects an object in front of the vehicle and a collision determination unit which determines a possibility of a collision with the object based on a detection result of the object detection device, the collision prevention system being capable of performing a process for reducing damage caused by the collision with the object; and
an invalidation unit that invalidates at least a part of a process of the collision prevention system based on the determination value and a detection value of the change amount in the traveling direction from the linear movement state,
wherein the determination value includes a first determination value and a second determination value larger than the first determination value,
wherein an invalidation state where the invalidation is performed is maintained after the detection value becomes larger than the second determination value until the detection value becomes equal to or smaller than the first determination value, and
wherein a non-invalidation state where the invalidation is not performed is maintained after the detection value becomes equal to or smaller than the first determination value until the detection value becomes larger than the second determination value.

2. The transporter vehicle according to claim 1, wherein even when the collision determination unit determines that there is a high possibility of the collision based on the detection result of the object detection device, the invalidation unit performs the invalidation when the detection value is larger than the determination value.

3. The transporter vehicle according to claim 1, wherein the transporter vehicle travels along a traveling road,
wherein the transporter vehicle travels along a curve of the traveling road provided with a road shoulder wall, and
wherein the determination value is determined based on a degree of the curve.

4. The transporter vehicle according to claim 3, further comprising:
a vessel,
wherein the transporter vehicle starts to move from at least one of a loading field where a load is loaded on the vessel and a soil disposal field where the load of the vessel is discharged and travels along the traveling road,
wherein, in the traveling road, the invalidation is not performed when the detection value is equal to or smaller than the determination value and the invalidation is performed when the detection value is larger than the determination value, and
wherein, in at least one of the loading field and the soil disposal field, the invalidation is performed in both cases where the detection value is equal to or smaller than the determination value and is larger than the determination value.

5. The transporter vehicle according to claim 1, wherein the invalidation unit invalidates at least a part of an output from any device constituting the collision prevention system.

6. The transporter vehicle according to claim 1, wherein the object detection device outputs a detection signal obtained by detecting the object to the collision determination unit, and
wherein the invalidation unit invalidates the detection signal output from the object detection device.

7. The transporter vehicle according to claim 1, further comprising:
a process system that is operated to reduce the damage caused by the collision with the object,
wherein the collision prevention system includes a control unit that outputs a control signal for reducing the damage caused by the collision based on a determination result of the collision determination unit, and wherein the invalidation unit invalidates the control signal output from the control unit.

8. The transporter vehicle according to claim 7, wherein the process system includes at least one of a braking device capable of performing a brake process on the traveling device, a power generation device capable of reducing a driving force for the traveling device, and an alarm device capable of performing an alarm generation process.

9. The transporter vehicle according to claim 1, wherein the collision prevention system includes a power supply unit that outputs a power for operating at least a part of the collision prevention system, and wherein the invalidation unit invalidates the power output from the power supply unit.

10. A dump truck comprising:
a traveling device capable of changing a traveling direction so that one state of a linear movement state and a non-linear movement state changes to the other state of the linear movement state and the non-linear movement state;
a determination value setting unit that sets a determination value related to a change amount in the traveling direction from the linear movement state;
a collision prevention system that includes an object detection device which detects an object in front of the vehicle, a collision determination unit which determines a possibility of collision with the object based on a detection result of the object detection device, and a control unit which outputs a control signal for reducing a damage caused by the collision based on a determination result of the collision determination unit, the collision prevention system being capable of performing a process for reducing the damage caused by the collision with the object;
an invalidation unit that invalidates the control signal output from the control unit of the collision prevention system based on the determination value and a detection value of the change amount in the traveling direction from the linear movement state; and
a process system that is operated to reduce the damage caused by the collision with the object,
wherein even when the collision determination unit determines that there is a high possibility of the collision based on the detection result of the object detection device, the invalidation unit performs the invalidation when the detection value is larger than the determination value,
wherein the determination value includes a first determination value and a second determination value larger than the first determination value,
wherein an invalidation state where the invalidation is performed is maintained after the detection value becomes larger than the second determination value until the detection value becomes equal to or smaller than the first determination value, and
wherein a non-invalidation state where the invalidation is not performed is maintained after the detection value becomes equal to or smaller than the first determination value until the detection value becomes larger than the second determination value.

11. A transporter vehicle control method comprising:
detecting a change amount in a traveling direction from a linear movement state of a transporter vehicle including a traveling device capable of changing the traveling direction so that one state of the linear movement state and a non-linear movement state changes to the other state of the linear movement state and the non-linear movement state;
setting a determination value related to the change amount in the traveling direction from the linear movement state;
detecting an object in front of the transporter vehicle by an object detection device of a collision prevention system provided in the transporter vehicle;
determining a possibility of collision between the transporter vehicle and the object in a collision determination unit of the collision prevention system based on a detection result of the object detection device; and
invalidating at least a part of a process for reducing damage caused by the collision between the transporter vehicle and the object in the collision prevention system based on the determination value and a detection value of the change amount in the traveling direction,
wherein the determination value includes a first determination value and a second determination value larger than the first determination value,
wherein an invalidation state where the invalidation is performed is maintained after the detection value becomes larger than the second determination value until the detection value becomes equal to or smaller than the first determination value, and
wherein a non-invalidation state where the invalidation is not performed is maintained after the detection value becomes equal to or smaller than the first determination value until the detection value becomes larger than the second determination value.

* * * * *